United States Patent
Kim et al.

(10) Patent No.: US 12,504,852 B2
(45) Date of Patent: Dec. 23, 2025

(54) DISPLAY DEVICE AND MOBILE ELECTRONIC DEVICE INCLUDING SAME

(71) Applicants: Samsung Display Co., LTD., Yongin-si (KR); Research & Business Foundation SUNGKYUNKWAN UNIVERSITY, Suwon-Si (KR)

(72) Inventors: Ji Hoon Kim, Yongin-si (KR); Kae Won Choi, Seoul (KR); Ji Yong Park, Seongnam-si (KR); Min Jun Jeong, Suwon-si (KR); Jang Hui Kim, Yongin-si (KR); Keum Dong Jung, Yongin-si (KR)

(73) Assignees: Samsung Display Co., Ltd., Yongin-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/806,422

(22) Filed: Aug. 15, 2024

(65) Prior Publication Data
US 2025/0224837 A1 Jul. 10, 2025

(30) Foreign Application Priority Data
Jan. 9, 2024 (KR) ........................ 10-2024-0003652

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/0443* (2019.05); *G06F 3/0446* (2019.05); *G06F 2203/04111* (2013.01)

(58) Field of Classification Search
CPC .. G06F 3/04184; G06F 3/0446; G06F 3/0443; G06F 3/0412; G06F 2203/04111
See application file for complete search history.

(56) References Cited

U.S. PATENT DOCUMENTS

| | | | |
|---|---|---|---|
| 7,812,827 B2 | 10/2010 | Hotelling et al. | |
| 2014/0327644 A1* | 11/2014 | Mohindra | G06F 3/044 345/174 |
| 2016/0195990 A1* | 7/2016 | Han | G06F 1/3262 345/173 |

FOREIGN PATENT DOCUMENTS

KR 10-2287790 B1 8/2021

OTHER PUBLICATIONS

An, Jae-Sung, et al., "A Capacitive Touch Chipset with 33.9dB Charge-Overflow Reduction Using Amplitude-Modulated Multi-Frequency Excitation and Wireless Power and Data Transfer to an Active Stylus," 2020 IEEE International Solid-State Circuits Conference, 2020, 3 pages.

(Continued)

*Primary Examiner* — Peter D McLoone
(74) *Attorney, Agent, or Firm* — Womble Bond Dickinson (US) LLP

(57) ABSTRACT

A display device includes: a display panel including a display layer and a touch layer; and a touch driving circuit connected to first electrodes and second electrodes of the touch layer. The touch driving circuit is to: determine frequencies of touch driving signals to be supplied to the first electrodes; assign the frequencies to the touch driving signals in an ascending order; determine a first phase of each of the touch driving signals that minimizes a cumulative value of PAPRs while sequentially varying phases of the touch driving signals; update the phases of the touch driving signals from the first phase to a second phase that minimizes the cumulative value of the PAPRs by sequentially varying the first phase of each of the touch driving signals; and output the touch driving signals based on the frequencies assigned to the touch driving signals, respectively, and the second phase.

20 Claims, 24 Drawing Sheets

(56) References Cited

OTHER PUBLICATIONS

Kim, Piljoong, et al., "A PAPR Reduction Technique for Fast Touch Sensors Adopting a Multiple Frequency Driving Method on Large Display Panels," Sensors, 2021, 16 pages.

Kim, SangYun, et al., "A High Noise Immunity, 28 x 16-Channel Finger Touch Sensing IC Using OFDM and Frequency Translation Technique," Sensors, 2018, 17 pages.

Ko, Seunghoon, et al., "A 70dB SNR Capacitive Touch Screen Panel Readout IC using Capacitor-less Trans-Impedance Amplifier and Coded Orthogonal Frequency-Division Multiple Sensing Scheme," 2013 Symposium on VLSI Circuits, 2013, pp. C216-C217.

Mohamed, M.G.A., et al., "Frequency Selection Concurrent Sensing Technique for High-Performance Touch Screens," Journal of Display Technology, IEEE, 2016, 12 pages.

Mohamed, M.G.A., et al., "OFDM and TDM Based Sensing Method for Large Projected Mutual-Capacitance Touch Screens," 2016 IEEE International Conference on Consumer Electronics (ICCE), IEEE, pp. 192-195.

Summair A., Malik, et al., "Hybrid Concurrent Driving Technique for Large Touch Screen Panels," 2019 International SoC Design Conference (ISOCC), 2019, pp. 79-80.

\* cited by examiner

DISPLAY DEVICE AND MOBILE ELECTRONIC DEVICE INCLUDING SAME

CROSS-REFERENCE TO RELATED APPLICATION

The present application claims priority to and the benefit of Korean Patent Application No. 10-2024-0003652, filed on Jan. 9, 2024, in the Korean Intellectual Property Office, the entire disclosure of which is incorporated by reference herein.

BACKGROUND

1. Field

Aspects of embodiments of the present disclosure relate to a display device, and a mobile electronic device including the display device.

2. Description of the Related Art

Display devices may be flat panel display devices, such as liquid crystal display devices, field emission display devices, or organic light emitting display devices. Among the flat panel display devices, a light emitting display device may display an image without using a backlight unit that provides light to a display panel, because each pixel of the display panel includes one or more light emitting elements that may emit light by themselves.

The display device may include a touch sensing device as an input device that recognizes a touch input. The touch sensing device may determine whether or not a touch input of a user has occurred in a capacitive manner, and may calculate an area where the touch input is sensed (e.g., touch input coordinates).

The above information disclosed in this Background section is for enhancement of understanding of the background of the present disclosure, and therefore, it may contain information that does not constitute prior art.

SUMMARY

Embodiments of the present disclosure may be directed to a display device capable of decreasing a peak-to-average ratio (PAPR) value indicating a noise influence of touch driving signals for driving a touch sensing device on a display unit (e.g., a display layer) for displaying a screen, and a mobile electronic device including the display device.

According to one or more embodiments of the present disclosure, a display device includes: a display panel including a display layer configured to display an image, and a touch layer on the display layer; and a touch driving circuit connected to a plurality of first electrodes and a plurality of second electrodes of the touch layer. The touch driving circuit is configured to: determine a plurality of frequencies of touch driving signals to be supplied to the plurality of first electrodes; assign the plurality of frequencies to the touch driving signals in an ascending order; determine a first phase of each of the touch driving signals that minimizes a cumulative value of peak-to-average ratios (PAPRs) while sequentially varying phases of the touch driving signals; update the phases of the touch driving signals from the first phase to a second phase that minimizes the cumulative value of the PAPRs by sequentially varying the first phase of each of the touch driving signals; and output the touch driving signals based on the plurality of frequencies assigned to the touch driving signals, respectively, and the second phase.

In an embodiment, the touch driving circuit may be further configured to: update the phases of the touch driving signals from the second phase to a third phase that minimizes the cumulative value of the PAPRs by sequentially varying the second phase of each of the touch driving signals; and output the touch driving signals based on the plurality of frequencies assigned to the touch driving signals, respectively, and the third phase.

In an embodiment, the touch driving circuit may be configured to repeatedly perform an operation of sequentially varying the phases of the touch driving signals a designated number of times to minimize the cumulative value of the PAPRs.

In an embodiment, the touch driving circuit may be configured to determine the first phase of each of the touch driving signals according to:

$$\text{Tx\_sig}_i = A\cos(2\pi f_i t + \theta_i)$$

where $\text{Tx\_sig}_i$ may be an i-th touch driving signal, and "$\theta_i$" may be a phase of the i-th touch driving signal.

In an embodiment, the touch driving circuit may be configured to determine the cumulative value of the PAPRs according to:

$$\text{sum\_sig} = \sum_{j=0}^{i} \text{Tx\_sig}_j$$

where "sum_sig" may be the cumulative value of the PAPRs.

In an embodiment, the touch driving circuit may be configured to determine orthogonal codes of the touch driving signals; and output the touch driving signals based on the determined orthogonal codes.

In an embodiment, the touch driving circuit may be configured to: include the orthogonal codes in the touch driving signals; add a guard period between periods during which symbols of the orthogonal codes are transmitted in each of the touch driving signals; and output a smoothing signal to which a designated roll-off factor may be applied in the added guard period.

In an embodiment, the touch driving circuit may be configured to: generate a cyclic suffix signal attached to a rear of an original signal including the symbols of the orthogonal codes by copying a first signal corresponding to a first symbol of the original signal, and applying the roll-off factor to the copied first signal; and generate a cyclic prefix signal attached to a front of the original signal by copying a second signal corresponding to a last symbol of the original signal, and applying the roll-off factor to the copied second signal.

In an embodiment, the touch driving circuit may be configured to determine a total length of each of the touch driving signals according to:

$$T_S = T_B + 2T_G$$

where "$T_S$" may be the total length of each of the touch driving signals, "$T_B$" may be a length of the original signal, and "$T_G$" may be a length of the cyclic suffix signal or the cyclic prefix signal.

In an embodiment, the touch driving circuit may be configured to generate the cyclic suffix signal or the cyclic prefix signal according to:

$$H(x) = \begin{cases} 1, & |x| \le \frac{1-\beta}{2T} \\ \frac{1}{2}\left[1 + \cos\left(\frac{\pi T}{\beta}\left(|x| - \frac{1-\beta}{2T}\right)\right)\right], & \frac{1-\beta}{2T} < |x| \le \frac{1+\beta}{2T} \\ 0, & \text{otherwise} \end{cases}$$

where "T" may be a total length of the signal, and "β" may be the roll-off factor.

According to one or more embodiments of the present disclosure, a mobile electronic device includes: a display panel including a display layer configured to display an image, and a touch layer on the display layer; and a touch driving circuit connected to a plurality of first electrodes and a plurality of second electrodes of the touch layer. The touch driving circuit is configured to: determine a plurality of frequencies of touch driving signals to be supplied to the plurality of first electrodes; assign the plurality of frequencies to the touch driving signals in an ascending order; determine a first phase of each of the touch driving signals that minimizes a cumulative value of PAPRs, while sequentially varying phases of the touch driving signals; update the phases of the touch driving signals from the first phase to a second phase that minimizes the cumulative value of the PAPRs by sequentially varying the first phase of each of the touch driving signals; and output the touch driving signals based on the plurality of frequencies assigned to the touch driving signals, respectively, and the second phase.

In an embodiment, the touch driving circuit may be further configured to: update the phases of the touch driving signals from the second phase to a third phase that minimizes the cumulative value of the PAPRs by sequentially varying the second phase of each of the touch driving signals; and output the touch driving signals based on the plurality of frequencies assigned to the touch driving signals, respectively, and the third phase.

In an embodiment, the touch driving circuit may be configured to repeatedly perform an operation of sequentially varying the phases of the touch driving signals a designated number of times to minimize the cumulative value of the PAPRs.

In an embodiment, the touch driving circuit may be configured to determine the first phase of each of the touch driving signals according to:

$$\text{Tx\_sig}_i = A \cos(2\pi f_i t + \theta_i)$$

where $\text{Tx\_sig}_i$ may be an i-th touch driving signal, and "$\theta_i$" may be a phase of the i-th touch driving signal.

In an embodiment, the touch driving circuit may be configured to determine the cumulative value of the PAPRs according to:

$$\text{sum\_sig} = \sum_{j=0}^{j} \text{Tx\_sig}_j$$

where "sum_sig" may be the cumulative value of the PAPRs.

In an embodiment, the touch driving circuit may be configured to: determine orthogonal codes of the touch driving signals; and output the touch driving signals based on the determined orthogonal codes.

In an embodiment, the touch driving circuit may be configured to: include the orthogonal codes in the touch driving signals; add a guard period between periods during which symbols of the orthogonal codes are transmitted in each of the touch driving signals; and output a smoothing signal to which a designated roll-off factor may be applied in the added guard period.

In an embodiment, the touch driving circuit may be configured to: generate a cyclic suffix signal attached to a rear of an original signal including the symbols of the orthogonal codes by copying a first signal corresponding to a first symbol of the original signal, and applying the roll-off factor to the copied first signal; and generate a cyclic prefix signal attached to a front of the original signal by copying a second signal corresponding to a last symbol of the original signal, and applying the roll-off factor to the copied second signal.

In an embodiment, the touch driving circuit may be configured to determine a total length of each of the touch driving signals according to:

$$T_S = T_B + 2T_G$$

where "$T_S$" may be the total length of each of the touch driving signals, "$T_B$" may be a length of the original signal, and "$T_G$" may be a length of the cyclic suffix signal or the cyclic prefix signal.

In an embodiment, the touch driving circuit may be configured to generate the cyclic suffix signal or the cyclic prefix signal according to:

$$H(x) = \begin{cases} 1, & |x| \le \frac{1-\beta}{2T} \\ \frac{1}{2}\left[1 + \cos\left(\frac{\pi T}{\beta}\left(|x| - \frac{1-\beta}{2T}\right)\right)\right], & \frac{1-\beta}{2T} < |x| \le \frac{1+\beta}{2T} \\ 0, & \text{otherwise} \end{cases}$$

where "T" may be a total length of the signal, and "β" may be the roll-off factor.

According to some embodiments of the present disclosure, a display device and a mobile electronic device including the display device may be provided in which it may be possible to decrease a peak-to-average ratio (PAPR) value, which is a noise influence of touch driving signals on a display unit for displaying a screen.

According to some embodiments of the present disclosure, it may be possible to prevent a signal from spreading to a frequency domain and electromagnetic interference (EMI) characteristics may be improved by including a guard period between periods during which symbols of orthogonal codes are transmitted in each of the touch driving signals, and outputting a smoothing signal to which a designated roll-off factor is applied in the guard period.

However, the aspects and features of the present disclosure are not limited to those set forth above, and the above and other aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
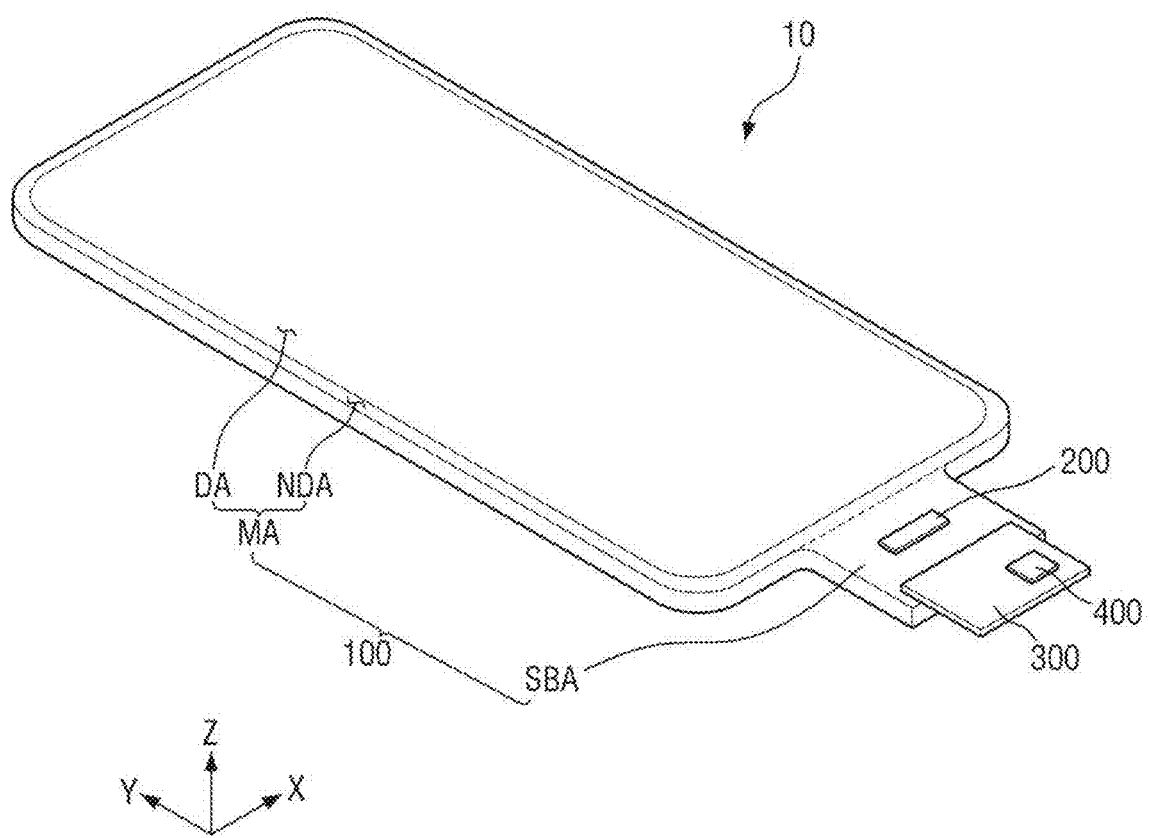
FIG. 1 is a schematic perspective view of a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
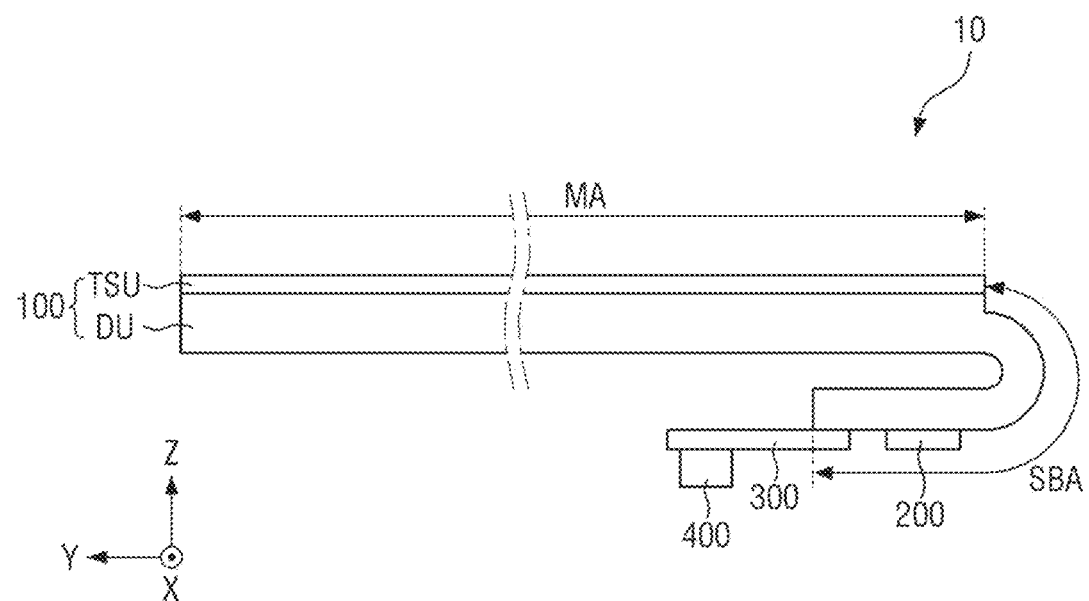
FIG. 2 is a schematic cross-sectional view of the display device according to an embodiment.

FIG. 1 is a schematic perspective view of a display device according to an embodiment. FIG. 2 is a schematic cross-sectional view of the display device according to an embodiment.

In the drawings, a first direction X is a direction parallel to or substantially parallel to one side of a display device 10 in a plan view, and refers to a short side direction of the display device 10. A second direction Y is a direction parallel to or substantially parallel to another side of the display device 10 in contact with the one side of the display device 10 a in plan view, and refers to a long side direction of the display device 10. A third direction Z refers to a thickness direction of the display device 10. However, the first to third directions X, Y, and Z are relative directions, and the present disclosure is not limited thereto.

The display device 10 may include various suitable electronic devices that provide display screens. For example, the display device 10 may be applied to portable electronic devices, such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be applied as a display unit (e.g., a display layer) DU of televisions, laptop computers, monitors, billboards, or Internet of Things (IOT) devices. For example, the display device 10 may be applied to wearable devices, such as smart watches, watch phones, glasses-type displays, and head mounted displays (HMDs).

Referring to FIG. 1, the display device 10 may have a shape similar to a rectangular shape in a plan view. For example, the display device 10 may have a shape, in a plan view, having short sides extending in the first direction X and long sides extending in the second direction Y. A corner where the short side extending in the first direction X and the long side extending in the second direction Y meet each other may be rounded with a curvature (e.g., a predetermined curvature) or may be right-angled. A shape of the display device 10 in a plan view is not limited to the rectangular shape, and may be a shape similar to other polygonal shapes, a circular shape, or an elliptical shape.

At least one of a front surface and/or a rear surface of the display device 10 may be a display surface. The "front surface" is a surface positioned on one side of one plane, and refers to a surface positioned in the third direction Z in the drawings. The "rear surface" is a surface positioned on the other side (e.g., an opposite side) of the one plane, and refers to a surface positioned in a direction opposite to the third direction Z in the drawings. The display device 10 may be a double-sided display device 10 in which a display is performed on both the front surface and the rear surface, but the present disclosure is not limited thereto, and embodiments in which the display surface is positioned on the front surface of the display device 10 will be mainly described in more detail hereinafter.

The display device 10 includes a display panel 100 for providing a display screen, a display driving circuit 200, a circuit board 300, and a touch driving circuit 400.

The display panel 100 may have a shape similar to a rectangular shape in a plan view. For example, the display panel 100 may have a shape having short sides extending in the first direction X and long sides extending in the second direction Y, in a plan view. A corner where the short side extending in the first direction X and the long side extending in the second direction Y meet each other may be rounded with curvature (e.g., a predetermined curvature) or may be right-angled. The shape of the display panel 100 in a plan view is not limited to the rectangular shape, and may be a shape similar to other polygonal shapes, a circular shape, or an elliptical shape. In addition, the display panel 100 may also be flexibly formed to be curved or bent.

The display panel 100 may include a main area MA and a sub-area SBA.

The main area MA may include a display area DA including pixels for displaying an image, and a non-display area NDA disposed around the display area DA. The display area DA may emit light from a plurality of emission areas or a plurality of opening areas. For example, the display panel 100 may include pixel circuits including switching elements, a pixel defining film defining the emission areas or the opening areas, and self-light emitting elements.

The non-display area NDA may be an area outside the display area DA. The non-display area NDA may be defined as an edge area of the main area MA of the display panel 100. The non-display area NDA may include a gate driver (e.g., 210 in FIG. 3) for supplying gate signals to gate lines (e.g., GL1 to GLn in FIG. 3) of the display panel 100.

The sub-area SBA may extend from one side of the main area MA. The sub-area SBA may be bent to overlap with the main area MA in the third direction Z. The sub-area SBA may include the display driving circuit 200 and pad parts connected to the circuit board 300.

Referring to FIG. 2, the display panel 100 includes a display unit (e.g., a display layer) DU and a touch unit (e.g., a touch layer) TSU.

Figure 3:
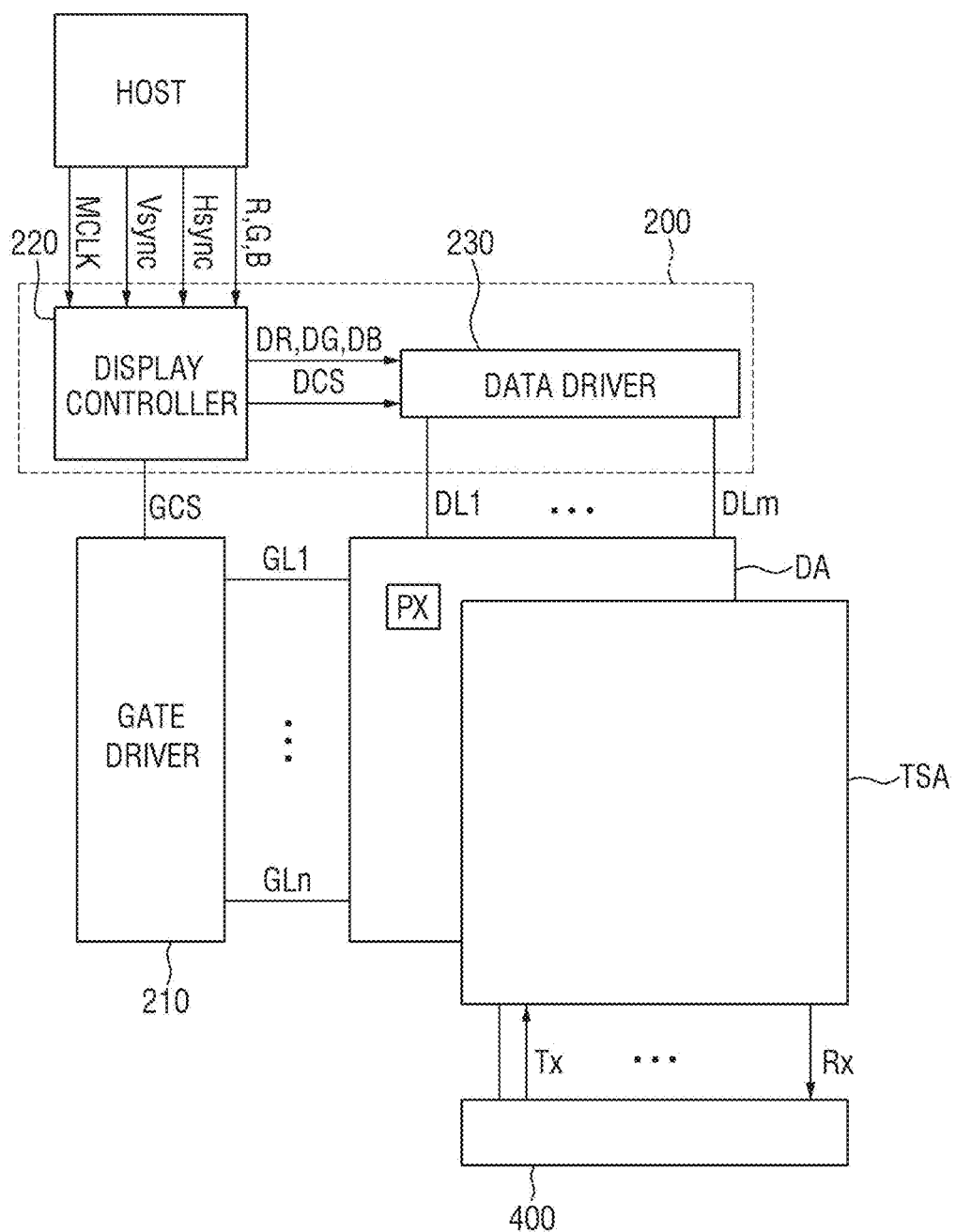
FIG. 3 is a conceptual diagram illustrating a display unit and a touch driving unit according to an embodiment.

The display unit DU may include a plurality of pixels PX (e.g., see FIG. 3). The pixel PX is a basic unit for displaying a screen. One pixel PX may include a red sub-pixel, a green sub-pixel, and a blue sub-pixel, but the present disclosure is not limited thereto. The plurality of pixels PX may be alternately arranged in a plan view. For example, the pixels PX may be disposed in a matrix form, but the present disclosure is not limited thereto.

The touch unit TSU may be disposed on the display unit DU, but the present disclosure is not limited thereto. For example, the touch unit TSU may be formed together with the display unit DU in an in-cell touch manner. The touch unit TSU may include a plurality of touch electrodes SEN (e.g., see FIG. 5) for sensing a user's touch in a capacitive manner, a plurality of touch driving lines TL connecting the plurality of touch electrodes SEN to the touch driving circuit 400, and a plurality of touch sensing lines RL. The touch unit TSU is a layer for sensing a touch input, and may function as a touch member. The touch unit TSU may determine whether or not the touch input has occurred, and may calculate a corresponding position as touch input coordinates. The display unit DU and the touch unit TSU will be described in more detail below with reference to FIGS. 4 to 7.

The display unit DU and the touch unit TSU may be disposed to overlap with each other. For example, the display area DA may be an area for displaying the screen and an area for sensing the touch input.

The sub-area SBA of the display panel 100 may extend from one side of the main area MA. The sub-area SBA may include a flexible material that may be bent, folded, and/or rolled. For example, a portion of the sub-area SBA may be bent on one side of the main area MA, and another portion of the sub-area SBA extending from the bent portion of the sub-area SBA may overlap with the main area MA in the third direction Z. The sub-area SBA may include the display driving circuit 200 and the pad parts connected to the circuit board 300.

Referring to FIG. 1, the display driving circuit 200 may be disposed in the sub-area SBA of the display panel 100. In addition, the display driving circuit 200 may be formed as an integrated circuit (IC), and mounted on the display panel 100 in a chip on plastic (COP) manner or a chip on glass (COG) manner.

The display driving circuit 200 may output data signals and voltages for driving the display panel 100. The display driving circuit 200 may supply data voltages to data lines (e.g., DL1 to DLm in FIG. 3) of the display panel 100. The display driving circuit 200 may supply source voltages to power lines of the display panel 100, and supply gate control signals to a gate driver (e.g., 210 in FIG. 3).

The circuit board 300 may be disposed in the sub-area SBA of the display panel 100. Lead lines of the circuit board 300 may be electrically connected to the pad parts of the display panel 100. The circuit board 300 may be a flexible printed circuit board, a printed circuit board, or a flexible film such as a chip on film.

The circuit board 300 may include a plurality of conductive lines for transferring signals from a main circuit board to the display driving circuit 200, or electrically connecting the touch driving circuit 400 and a plurality of first electrodes TE and a plurality of second electrodes RE of the touch unit TSU to each other.

Herein, the first electrode TE may be referred to as a "touch driving electrode" or a "Tx electrode", and the second electrode RE may be referred to as a "touch sensing electrode" or an "Rx electrode".

The touch driving circuit 400 may be disposed in the sub-area SBA of the display panel 100. As another example, the touch driving circuit 400 may be mounted on the circuit board 300.

Figure 5:
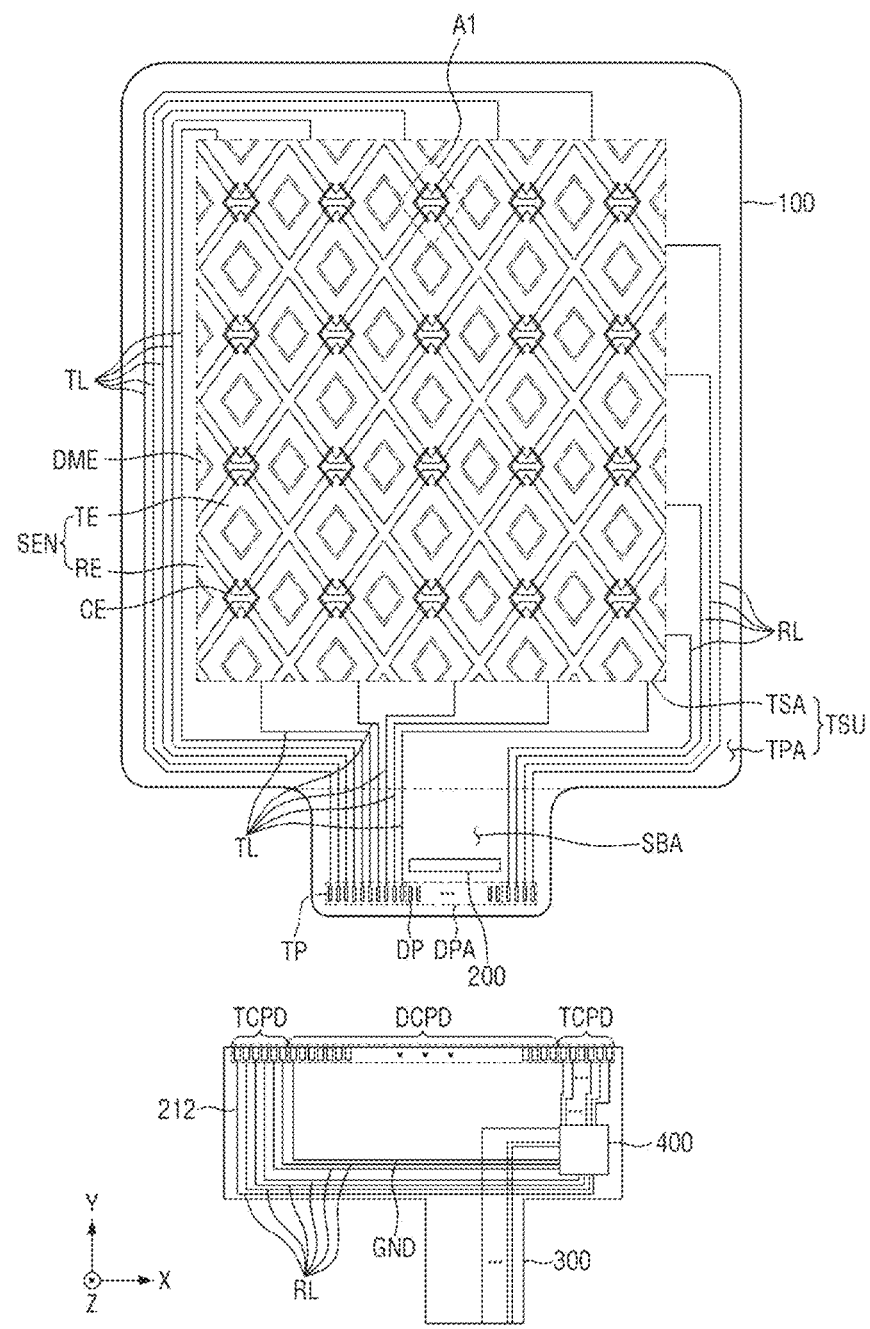
FIG. 5 is a plan view illustrating a touch unit of the display device according to an embodiment.

The touch driving circuit 400 may determine whether or not a touch input has occurred and may calculate touch coordinates, based on sensing change amounts in a capacitance between the plurality of touch electrodes (e.g., SEN in FIG. 5). The touch driving circuit 400 may be formed as an integrated circuit (IC), and may be mounted on the display panel 100 in a chip on plastic (COP) manner or a chip on glass (COG) manner.

Figure 4:
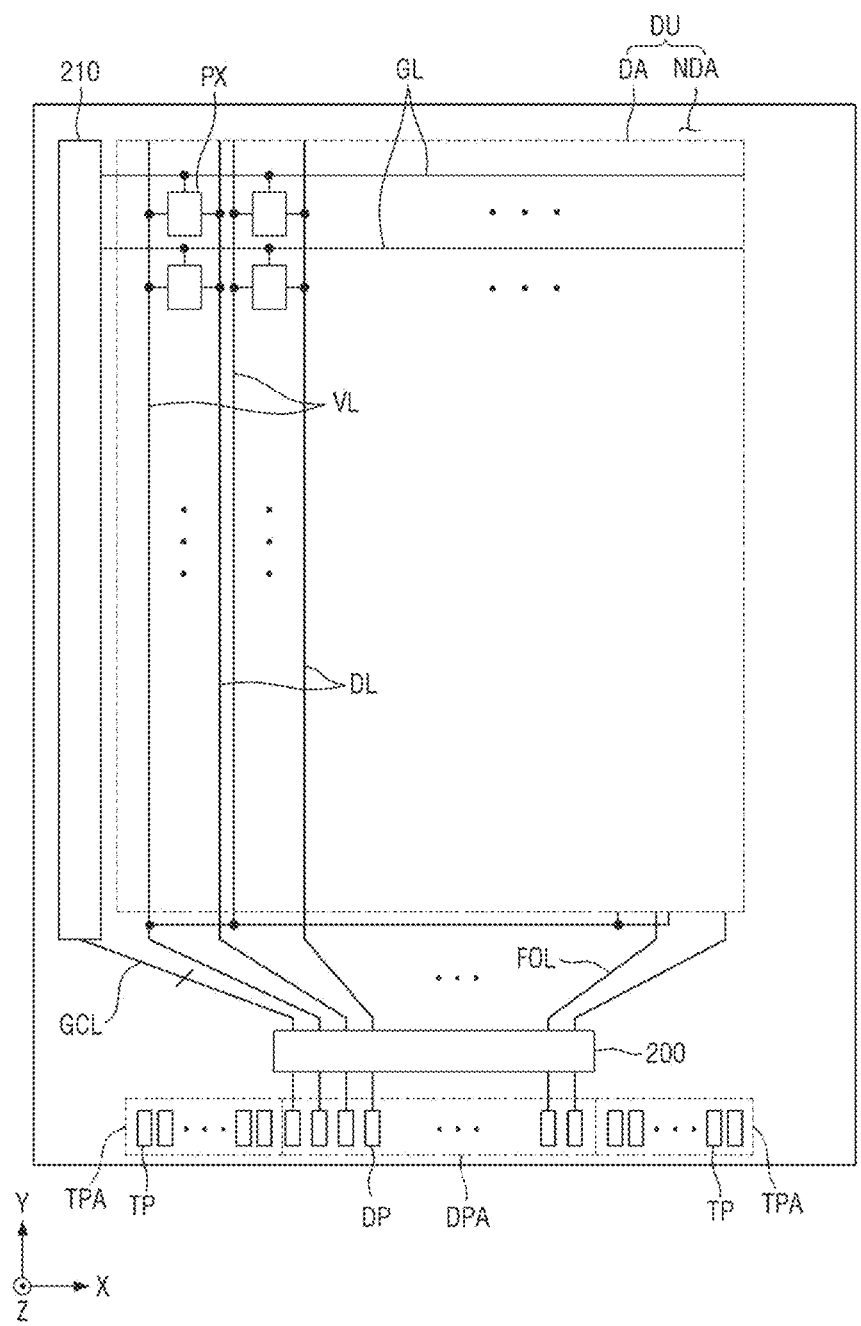
FIG. 4 is a schematic plan view illustrating the display unit of the display device according to an embodiment.

FIG. 3 is a conceptual diagram illustrating a display unit and a touch driving unit according to an embodiment. FIG. 4 is a schematic plan view illustrating the display unit of the display device according to an embodiment.

Referring to FIGS. 3 and 4, the display device 10 includes the display panel 100 including the plurality of pixels PX, the display driving circuit 200, and the touch driving circuit 400. The display driving circuit 200 and the touch driving circuit 400 may operate based on control signals or command signals from a host. For example, the host may be a processor or an application processor. According to an embodiment, the touch driving circuit 400 may be controlled by the display driving circuit 200.

The display driving circuit 200 may include a data driver 230 and a display controller 220. The display controller 220 may be referred to as a "timing controller".

The display controller 220 may receive input data R, G, and B and a timing control signal from an external device (e.g., a host). The timing control signal may include a vertical synchronization signal Vsync indicating one frame period, a horizontal synchronization signal Hsync indicating one horizontal period, and a main clock MCLK that may be repeated at a suitable cycle (e.g., a predetermined cycle). The input data R, G, and B may be RGB data including red image data, green image data, and blue image data. The display controller 220 may generate output data signals DR, DG, and DB and an internal control signal using the received input data R, G, and B and the timing control signal. The internal control signal includes a data control signal DCS and a gate control signal GCS.

The display controller 220 may control an operation of the data driver 230 by providing the data control signal DCS to the data driver 230. The display controller 220 may control an operation of the gate driver 210 by providing the gate control signal GCS to the gate driver 210.

The data driver 230 may receive the output data signals DR, DG, and DB and the data control signal DCS from the display controller 220. The data driver 230 may generate data signals using the received output data signals DR, DG, and DB and data control signal DCS. The data driver 230 may provide the generated data signals to the display panel 100. The data driver 230 may provide the data signals to the plurality of pixels PX through a plurality of data lines DL1 to DLm formed in the display panel 100, where m is an integer greater than 1.

The gate driver 210 may receive the gate control signal GCS from the display controller 220. The gate driver 210 may generate gate signals using the received gate control signal GCS. The gate driver 210 may provide the generated gate signals to the display panel 100. The gate driver 210 may provide the gate signals to the plurality of pixels PX through a plurality of gate lines GL1 to GLn formed in the display panel 100, where n is an integer greater than 1. The plurality of data lines DL1 to DLm and the plurality of gate lines GL1 to GLn will be described in more detail below with reference to FIG. 4.

FIG. 3 illustrates that the display driving circuit 200 does not include the gate driver 210, but the present disclosure is not limited thereto. For example, the gate driver 210 may be included in the display driving circuit 200 for controlling an operation of the display panel 100. The gate driver 210, the data driver 230, and the display controller 220 may be formed as integrated circuits (ICs). The gate driver 210 may be formed together with the data driver 230 in a thin film transistor (TFT) process of the display panel 100. The display controller 220 and the data driver 230 may be incorporated with each other as one or more timing controller embedded driver integrated circuits (TEDs).

The display panel 100 may include the plurality of pixels PX connected to the plurality of data lines DL1 to DLm and the plurality of gate lines GL1 to GLn.

A frame frequency at which the display driving circuit 200 drives the display panel 100 may vary. For example, the frame frequency may vary within a range of about 1 Hz to about 240 Hz according to a host's selection or a user's selection. The display driving circuit 200 may be driven at about 60 Hz during one period, and may change the frame frequency to about 120 Hz during another period according to the user's desires or needs.

A touch sensing area TSA may include the plurality of first electrodes TE (e.g., see FIG. 5), the plurality of second electrodes RE, the plurality of touch driving lines TL, and the touch sensing lines RL. The touch sensing area TSA may sense a touch input by receiving electrical signals Tx from the touch driving circuit 400 disposed on the circuit board 300 through the plurality of touch driving lines TL, or by transmitting electrical signals Rx sensed from the plurality of second electrodes RE to the touch driving circuit 400 through the plurality of touch sensing lines RL. In more detail, the touch driving circuit 400 may sense the touch input by converting analog electrical signals Rx sensed in the touch sensing area TSA into digital signals. The touch driving circuit 400 will be described in more detail below with reference to FIG. 5.

Referring to FIG. 4, the display unit DU may include a display area DA and a non-display area NDA. The display unit DU may include a plurality of pixels PX, and the plurality of gate lines GL and the plurality of data lines DL connected to the plurality of pixels PX.

The plurality of gate lines GL may supply the gate signals received from the gate driver 210 to the plurality of pixels PX. The plurality of gate lines GL may extend in the first direction X, and may be spaced apart from each other in the second direction Y crossing the first direction X.

The plurality of data lines DL may supply the output data signals DR, DG, and DB and the data signals received from the display driving circuit 200 to the plurality of pixels PX. The plurality of data lines DL may extend in the second direction Y, and may be spaced apart from each other in the first direction X.

The non-display area NDA may surround (e.g., around a periphery of) the display area DA. For example, the non-display area NDA may include the gate driver 210 for applying the gate signals to the plurality of gate lines GL, fan-out lines FOL connecting the plurality of data lines DL and the display driving circuit 200 to each other, and display pad parts DP connected to the circuit board 300.

The display driving circuit 200 may supply the gate control signal GCS to the gate driver 210 through a gate control line GCL. The gate driver 210 may generate a plurality of gate signals based on the gate control signal GCS, and may sequentially supply the plurality of gate signals to the plurality of gate lines GL according to a suitable order (e.g., a set or predetermined order).

The display driving circuit 200 may supply a first source voltage to first power lines VL and may supply a second source voltage to second power lines, through the data driver 230. Each of the plurality of pixels PX may receive the first source voltage through a corresponding first power line VL, and may receive the second source voltage through the second power line. The first source voltage may be a high level voltage (e.g., a predetermined high level voltage), and the second source voltage may be a voltage lower than that of the first source voltage.

A display pad area DPA and touch pad areas TPA may be disposed at an edge of the display panel 100. The display pad area DPA may include the plurality of display pad parts DP. The plurality of display pad parts DP may be connected to a main processor through the circuit board 300. The plurality of display pad parts DP may be connected to the circuit board 300 to receive digital video data, and may supply the digital video data to the display driving circuit 200.

FIG. 5 is a plan view illustrating a touch unit of the display device according to an embodiment.

Referring to FIG. 5, the touch unit TSU may include a touch sensing area TSA for sensing a user's touch, and a touch peripheral area TPA disposed around the touch sensing area TSA. The touch sensing area TSA may overlap with the display area DA of the display panel 100, and the touch peripheral area TPA may overlap with the non-display area NDA of the display panel 100.

The touch unit TSU may include the plurality of touch electrodes SEN, the plurality of touch driving lines TL, and the plurality of touch sensing lines RL. The plurality of touch electrodes SEN may include the plurality of first electrodes TE and the plurality of second electrodes RE.

The circuit board 300 may include first circuit pad parts DCPD connected to the display pad parts DP of the display panel 100, second circuit pad parts TCPD connected to touch pad parts TP of the display panel 100, and touch circuit lines 212 connecting the second circuit pad parts TCPD and the touch driving circuit 400 to each other.

The touch sensing area TSA may include the plurality of first electrodes TE and the plurality of second electrodes RE as the touch electrodes SEN. The plurality of first electrodes TE and the plurality of second electrodes RE may be electrically connected to the touch driving circuit 400 on the circuit board 300. The touch sensing area TSA may receive electrical signals from the touch driving circuit 400 disposed on the circuit board 300 through the plurality of touch driving lines TL and touch sensing lines RL, or may transmit electrical signals sensed from the plurality of first electrodes TE and second electrodes RE to the touch driving circuit 400 through the plurality of touch driving lines TL and touch sensing lines RL.

The plurality of first electrodes TE may be arranged along the first direction X and the second direction Y. The plurality of first electrodes TE may be spaced apart from each other in the first direction X and the second direction Y. The first electrodes TE that are adjacent to each other in the second direction Y may be electrically connected to each other through a bridge electrode CE.

The plurality of first electrodes TE may be connected to the touch pad parts TP through the touch driving lines TL. Some of the plurality of touch driving lines TL may extend to the touch pad parts TP via a lower side of the touch peripheral area TPA. The others of the plurality of touch driving lines TL may extend to the touch pad parts TP via an upper side, a left side, and the lower side of the touch peripheral area TPA. The touch pad parts TP may be connected to the touch driving circuit 400 through the circuit board 300.

The display pad area DPA and the touch pad area TPA may be disposed at an edge of the sub-area SBA of the display panel 100. The display pad area DPA and the touch pad areas TPA may be electrically connected to the circuit board 300 using a low-resistance and a high-reliability material, such as an anisotropic conductive film.

The plurality of second electrodes RE may extend in the first direction X, and may be spaced apart from each other in the second direction Y. The plurality of second electrodes RE may be arranged along the first direction X and the second direction Y, and the plurality of second electrodes RE that are adjacent to each other in the first direction X may be electrically connected to each other through a connection part.

The plurality of second electrodes RE may be connected to the touch pad parts TP through the plurality of touch sensing lines RL. For example, the plurality of sensing electrodes RE disposed on a right side of the touch sensing area TSA may be connected to the touch pad parts TP through the plurality of touch sensing lines RL. The plurality of touch sensing lines RL may extend to the touch pad parts TP via a right side and the lower side of the touch peripheral area TPA. The touch pad parts TP may be connected to the touch driving circuit 400 through the circuit board 300.

The plurality of first electrodes TE and second electrodes RE may not hinder the travel of light emitted from the display area DA by including a planar pattern formed of a transparent conductive layer, or by including a mesh pattern in which an opaque metal is used along an area where light emitting elements are not disposed.

A touch driving signal may be applied from the touch driving circuit 400 to each of the plurality of first electrodes TE through any corresponding one of the plurality of touch driving lines TL. When the touch driving signals are applied to the plurality of first electrodes TE, a mutual capacitance may be formed between adjacent first electrodes TE and second electrodes RE. When a touch input occurs from the outside, mutual capacitance values between the adjacent first electrodes TE and second electrodes RE may change. The change in the mutual capacitances between the adjacent first electrodes TE and second electrodes RE may be transferred to the touch driving circuit 400 through the plurality of touch sensing lines RL. Accordingly, the touch driving circuit 400 may determine whether or not the touch input has occurred, and may calculate a corresponding position as touch input coordinates. The touch sensing may be performed in a mutual capacitance manner, but the present disclosure is not limited thereto.

While a mutual capacitance sensing between the first electrodes TE and the second electrodes RE have been described, the present disclosure is not limited thereto. For example, the touch unit TSU according to another embodiment of the present disclosure may sense the touch in a self-capacitance manner.

In FIG. 5 a ground line GND may be formed on the circuit board 300.

In FIG. 5, a dummy electrode DME is further shown. The plurality of first electrodes TE, the plurality of second electrodes RE, and a plurality of dummy electrodes DE may be disposed at the same layer as each other, and may be spaced apart from each other.

Figure 6:
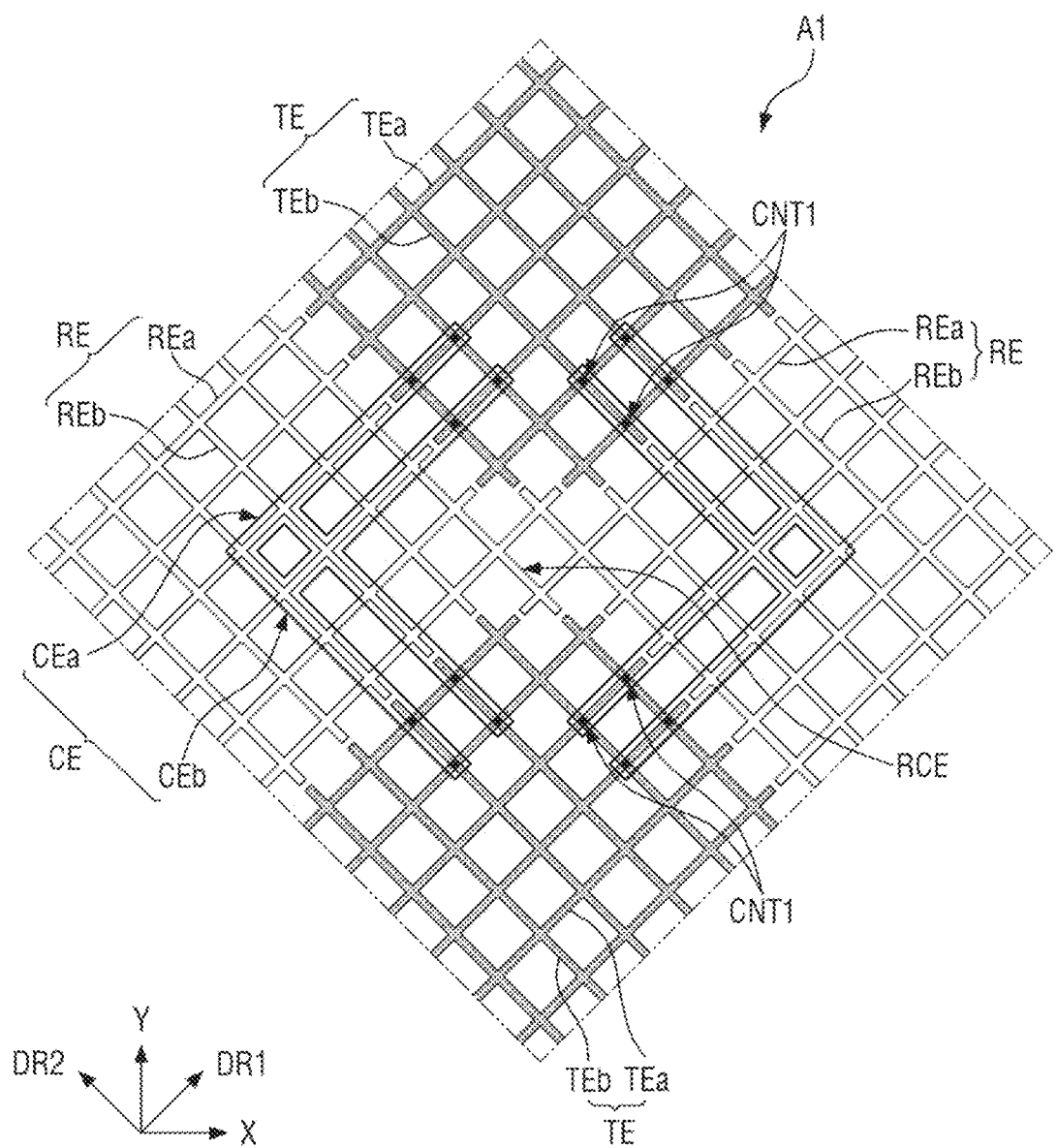
FIG. 6 is an enlarged view of the area A1 of FIG. 5.
Figure 7:
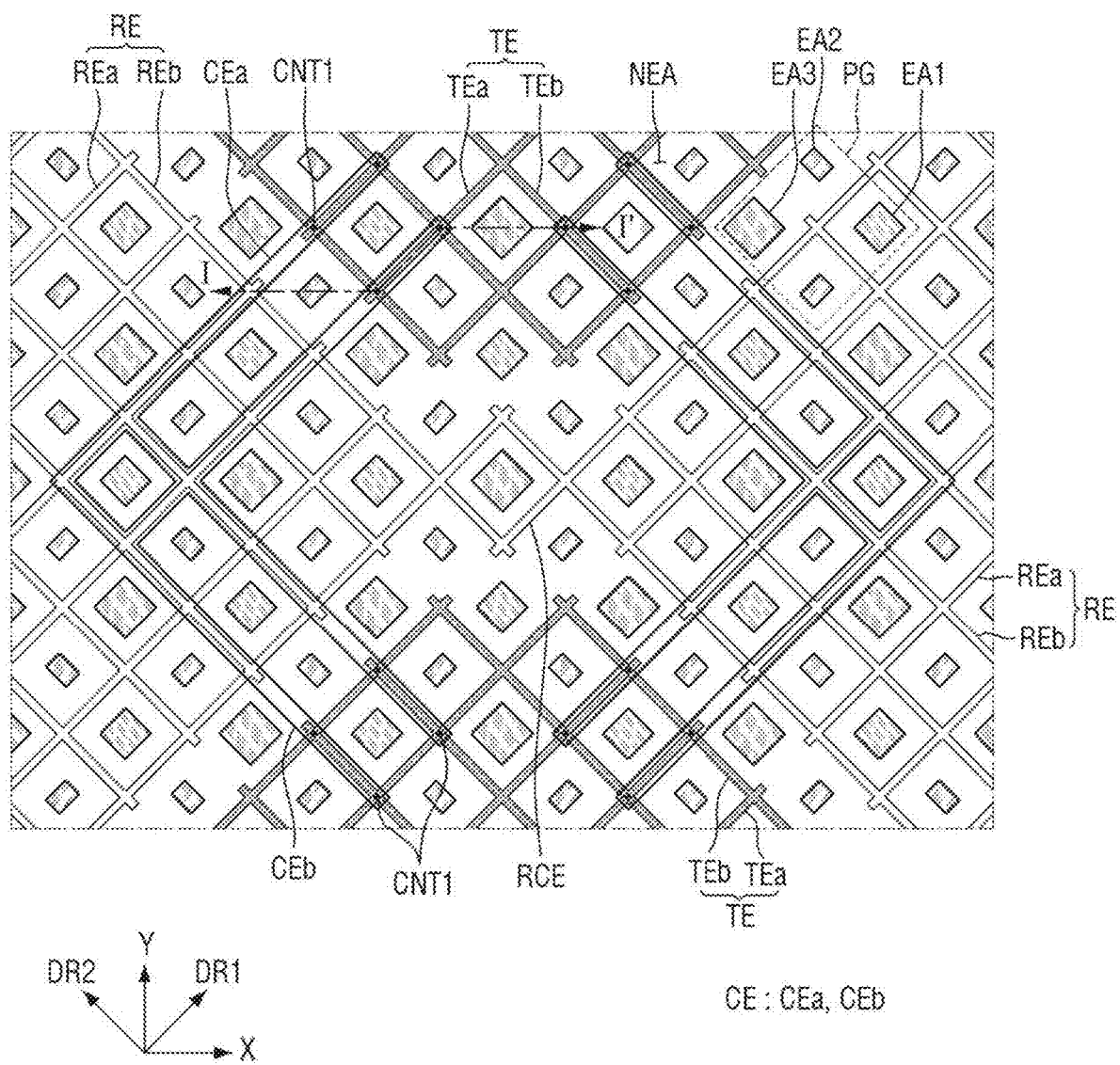
FIG. 7 is an enlarged view illustrating a portion of the display device according to an embodiment.

FIG. 6 is an enlarged view of the area A1 of FIG. 5. FIG. 7 is an enlarged view illustrating a portion of the display device according to an embodiment.

Referring to FIGS. 6 and 7, the plurality of first electrodes TE may be arranged along the first direction X and the second direction Y. The plurality of first electrodes TE may be spaced apart from each other in the first direction X and the second direction Y. The first electrodes TE that are adjacent to each other in the second direction Y may be electrically connected to each other through the bridge electrode CE.

The plurality of second electrodes RE may extend in the first direction X, and may be spaced apart from each other in the second direction Y. The plurality of second electrodes RE may be arranged along the first direction X and the second direction Y, and the second electrodes RE that are adjacent to each other in the first direction X may be electrically connected to each other through a connection part RCE. For example, the connection part RCE of the second electrodes RE may be disposed to traverse between the first electrodes TE that are adjacent to each other.

A plurality of bridge electrodes CE may be disposed at a different layer from that of the first electrodes TE and the second electrodes RE. The bridge electrode CE may include a first portion CEa and a second portion CEb. For example, the second portion CEb of the bridge electrode CE may be connected to the first electrode TE disposed on one side through a first contact hole CNT1, and may extend in another direction DR2. The first portion CEa of the bridge electrode CE may be bent from the second portion CEb, and may extend in one direction DR1 in an area overlapping with the second electrode RE. The first portion CEa may be connected to the first electrode TE disposed on the other side through a first contact hole CNT1. The one direction DR1 may be a direction between the first direction X and the second direction Y, and the other direction DR2 may be a direction crossing the one direction DR1. For example, each of the plurality of bridge electrodes CE may connect the first electrodes TE that are adjacent to each other in the second direction Y to each other.

According to an embodiment, the plurality of first electrodes TE, the plurality of second electrodes RE, and the plurality of dummy electrodes DME (e.g., see FIG. 5) may be formed in a mesh structure or a net structure in a plan view. The plurality of first electrodes TE, the plurality of second electrodes RE, and the plurality of dummy electrodes DME (e.g., see FIG. 5) may not overlap with first to third emission areas EA1, EA2, and EA3 of the pixels PX. The plurality of bridge electrodes CE may not overlap with the first to third emission areas EA1, EA2, and EA3. Accordingly, the display device 10 may prevent or substantially prevent a luminance of light emitted from the first to third emission areas EA1, EA2, and EA3 from being reduced by the touch unit TSU.

Each of the plurality of first electrodes TE may include a first portion TEa extending in the one direction DR1, and a second portion TEb extending in the other direction DR2. Each of the plurality of second electrodes RE may include a first portion REa extending in the one direction DR1, and a second portion REb extending in the other direction DR2.

According to another embodiment, the plurality of first electrodes TE, the plurality of second electrodes RE, and the plurality of dummy electrodes DME (e.g., see FIG. 5) may be formed in an entire surface structure, rather than in a mesh structure or a net structure in a plan view. In this case, the plurality of first electrodes TE, the plurality of second electrodes RE, and the plurality of dummy electrodes DME (e.g., see FIG. 5) may each include a transparent conductive material having a high light transmittance, such as indium tin oxide (ITO) or indium zinc oxide (IZO).

The plurality of pixels PX may include first to third sub-pixels, and the first to third sub-pixels may include the first to third emission areas EA1, EA2, and EA3, respectively. For example, the first emission area EA1 may emit light of a first color (e.g., red light), the second emission area EA2 may emit light of a second color (e.g., green light), and the third emission area EA3 may emit light of a third color (e.g., blue light), but the present disclosure is not limited thereto.

One pixel PX may include one first emission area EA1, two second emission areas EA2, and one third emission area EA3 to express a white gradation. Accordingly, a white gradation may be expressed by a combination of light emitted from one first emission area EA1, light emitted from two second emission areas EA2, and light emitted from one third emission area EA3.

Figure 8:
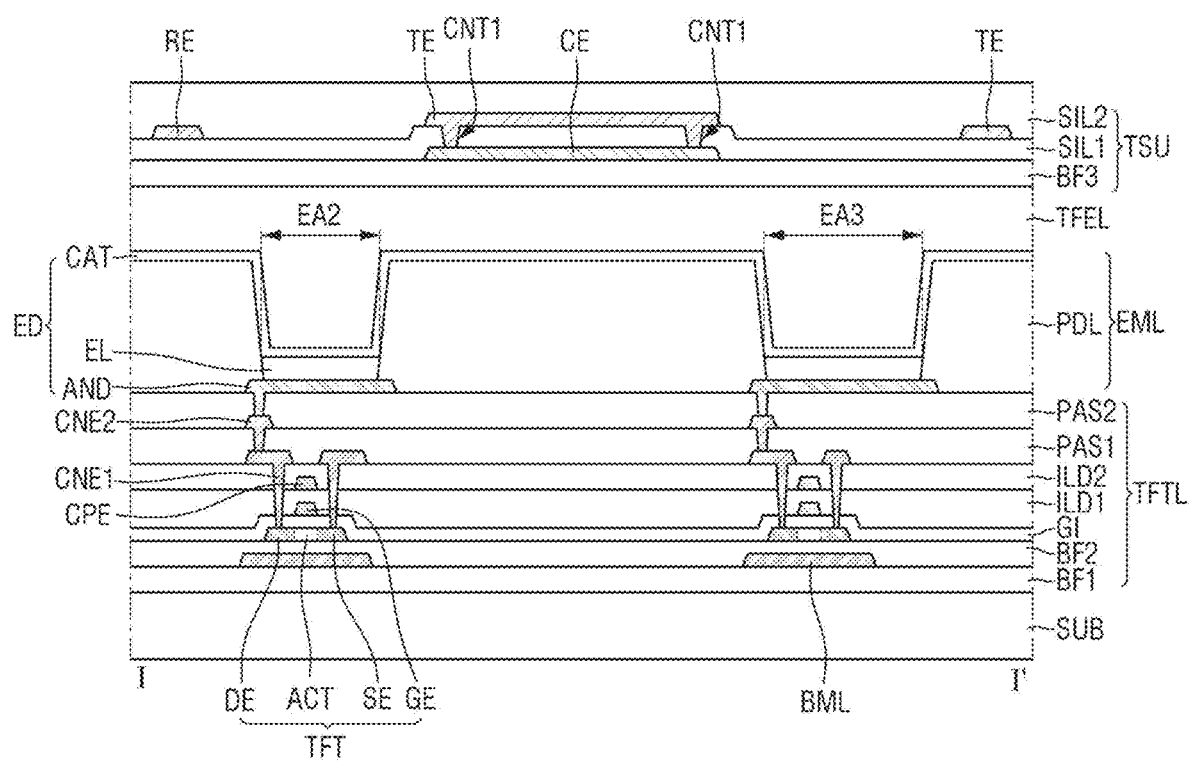
FIG. 8 is a cross-sectional view of the display device taken along the line I-I' of FIG. 7 according to an embodiment.

FIG. 8 is a cross-sectional view of the display device taken along the line I-I' of FIG. 7 according to an embodiment.

Referring to FIG. 8, the display panel 100 may include the display unit DU and the touch unit TSU. The display unit DU may include a substrate SUB, a thin film transistor layer TFTL, a light emitting element layer EML, and an encapsulation layer TFEL.

The substrate SUB may support the display panel 100. The substrate SUB may be a base substrate or a base member, and may include (e.g., may be made of) an insulating material such as a polymer resin. As an example, the substrate SUB may be a flexible substrate that may be bent, folded, or rolled. As another example, the substrate SUB may include a flexible material and a rigid material.

The thin film transistor layer TFTL may include first and second buffer layers BF1 and BF2, thin film transistors TFT, a gate insulating film GI, a first interlayer insulating film ILD1, capacitor electrodes CPE, a second interlayer insulating film ILD2, first connection electrodes CNE1, a first passivation layer PAS1, second connection electrodes CNE2, and a second passivation layer PAS2.

The first buffer layer BF1 may be disposed on the substrate SUB. The first buffer layer BF1 may include an inorganic film capable of preventing or substantially preventing permeation of air and/or moisture. For example, the first buffer layer BF1 may include a plurality of inorganic films that are alternately stacked.

A light blocking layer BML may be disposed on the first buffer layer BF1. As an example, the light blocking layer BML may be formed as a single layer or multiple layers including (e.g., made of) at least any suitable one of molybdenum (Mo), aluminum (Al), chromium (Cr), gold (Au), titanium (Ti), nickel (Ni), neodymium (Nd), copper (Cu), or a suitable alloy thereof. As another example, the light blocking layer BML may be an organic film including a black pigment.

The second buffer layer BF2 may cover the first buffer layer BF1 and the light blocking layer BML. The second buffer layer BF2 may include an inorganic film capable of preventing or substantially preventing permeation of air and/or moisture. For example, the second buffer layer BF2 may include a plurality of inorganic films that are alternately stacked.

The thin film transistor TFT may be disposed on the second buffer layer BF2, and may constitute a pixel circuit of a corresponding one of the plurality of pixels. For example, the thin film transistor TFT may be a driving transistor or a switching transistor of the pixel circuit. The thin film transistor TFT may include a semiconductor region ACT, a gate electrode GE, a source electrode SE, and a drain electrode DE.

The semiconductor region ACT, the source electrode SE, and the drain electrode DE may be disposed on the second buffer layer BF2. The semiconductor region ACT may overlap with the gate electrode GE in the thickness direction, and may be insulated from the gate electrode GE by the gate insulating film GI. The source electrode SE and the drain electrode DE may be formed by making a material of the semiconductor region ACT conductors.

The gate electrode GE may be disposed on the gate insulating film GI. The gate electrode GE may overlap with the semiconductor region ACT with the gate insulating film GI interposed therebetween.

The gate insulating film GI may be disposed on the semiconductor region ACT, the source electrode SE, and the drain electrode DE. For example, the gate insulating film GI may cover the semiconductor region ACT, the source electrode SE, the drain electrode DE, and the second buffer layer BF2, and may insulate the semiconductor region ACT and the gate electrode GE from each other. The gate insulating film GI may include contact holes through which the first connection electrodes CNE1 penetrate.

The first interlayer insulating film ILD1 may cover the gate electrode GE and the gate insulating film GI. The first interlayer insulating film ILD1 may include contact holes through which the first connection electrodes CNE1 penetrate. The contact holes of the first interlayer insulating film ILD1 may be connected to the contact holes of the gate insulating film GI and contact holes of the second interlayer insulating film ILD2.

The capacitor electrodes CPE may be disposed on the first interlayer insulating film ILD1. The capacitor electrode CPE may overlap with the gate electrode GE in the third direction Z.

The second interlayer insulating film ILD2 may cover the capacitor electrodes CPE and the first interlayer insulating film ILD1. The second interlayer insulating film ILD2 may include contact holes through which the first connection electrodes CNE1 penetrate. The contact holes of the second interlayer insulating film ILD2 may be connected to the contact holes of the first interlayer insulating film ILD1 and the contact holes of the gate insulating film GI.

The first connection electrodes CNE1 may be disposed on the second interlayer insulating film ILD2. The first connection electrode CNE1 may connect the drain electrode DE of the thin film transistor TFT and the second connection electrode CNE2 to each other. The first connection electrode CNE1 may be inserted into the contact holes formed in the second interlayer insulating film ILD2, the first interlayer insulating film ILD1, and the gate insulating film GI to be in contact with the drain electrode DE of the thin film transistor TFT.

The first passivation layer PAS1 may cover the first connection electrodes CNE1 and the second interlayer insulating film ILD2. The first passivation layer PAS1 may protect the thin film transistors TFT. The first passivation layer PAS1 may include contact holes through which the second connection electrodes CNE2 penetrate.

The second connection electrodes CNE2 may be disposed on the first passivation layer PAS1. The second connection electrode CNE2 may connect the first connection electrode CNE1 and a pixel electrode AND of a light emitting element ED to each other. The second connection electrode CNE2 may be inserted into the contact hole provided in the first passivation layer PAS1 to be in contact with the first connection electrode CNE1.

The second passivation layer PAS2 may cover the second connection electrodes CNE2 and the first passivation layer PAS1. The second passivation layer PAS2 may include contact holes through which the pixel electrodes AND of the light emitting elements ED penetrate.

The light emitting element layer EML may be disposed on the thin film transistor layer TFTL. The light emitting element layer EML may include the light emitting elements ED and a pixel defining film PDL. The light emitting element ED may include the pixel electrode AND, a light emitting layer EL, and a common electrode CAT.

The pixel electrode AND may be disposed on the second passivation layer PAS2. The pixel electrode AND may be disposed to overlap with one of the first to third emission areas EA1, EA2, and EA3 defined by the pixel defining film PDL. The pixel electrode AND may be connected to the drain electrode DE of the thin film transistor TFT through the first and second connection electrodes CNE1 and CNE2.

The light emitting layer EL may be disposed on the pixel electrode AND. For example, the light emitting layer EL may be an organic light emitting layer including (e.g., made of) an organic material, but the present disclosure is not limited thereto. In the case where the light emitting layer EL is the organic light emitting layer, when the thin film transistor TFT applies a voltage (e.g., a predetermined voltage) to the pixel electrode AND of the light emitting element ED, and the common electrode CAT of the light emitting element ED receives a common voltage or a cathode voltage, holes and electrons may move to the organic light emitting layer EL through a hole transporting layer and an electron transporting layer, respectively, and may be combined with each other in the organic light emitting layer EL to emit light.

The common electrode CAT may be disposed on the light emitting layer EL. For example, the common electrode CAT may not be divided for each of the plurality of pixels PX, and may be implemented in the form of an electrode covering all of the pixels PX in common. For example, the common electrode CAT may be disposed on the light emitting layers EL in the first to third emission areas EA1, EA2, and EA3, and may be disposed on the pixel defining film PDL in an area other than the first to third emission areas EA1, EA2, and EA3.

The pixel defining film PDL may define the first to third emission areas EA1, EA2, and EA3. The pixel defining film PDL may space and insulate the pixel electrodes AND of a plurality of light emitting elements ED from each other.

The encapsulation layer TFEL may be disposed on the common electrodes CAT to cover the plurality of light emitting elements ED. The encapsulation layer TFEL may include at least one inorganic film to prevent or substantially prevent oxygen and/or moisture from permeating into the light emitting element layer EML. The encapsulation layer TFE may include at least one organic film to protect the light emitting element layer EML from foreign substances, such as dust.

The touch unit TSU may be disposed on the encapsulation layer TFEL. The touch unit TSU may include a third buffer layer BF3, the bridge electrodes CE, a first insulating layer SIL1, the first electrodes TE, the second electrodes RE, and a second insulating layer SIL2.

The third buffer layer BF3 may be disposed on the encapsulation layer TFEL. The third buffer layer BF3 may have insulating and optical functions. The third buffer layer BF3 may include at least one inorganic film. As another example, the third buffer layer BF3 may be omitted as needed or desired.

The bridge electrodes CE may be disposed on the third buffer layer BF3. The bridge electrodes CE may be disposed at a different layer from that of the first electrodes TE and the second electrodes RE, and may connect the first electrodes TE that are adjacent to each other in the second direction (e.g., the second direction Y of FIG. 7) to each other. For example, the bridge electrode CE may be formed as a single layer including (e.g., made of) molybdenum (Mo), titanium (Ti), copper (Cu), or aluminum (Al), or may be formed as a stacked structure of aluminum and titanium (e.g., Ti/Al/Ti), a stacked structure of aluminum and ITO (e.g., ITO/Al/ITO), an APC alloy, or a stacked structure of an APC alloy and ITO (e.g., ITO/APC/ITO).

The first insulating layer SIL1 may cover the bridge electrodes CE and the third buffer layer BF3. The first insulating layer SIL1 may have insulating and optical functions. For example, the first insulating layer SIL1 may be formed as an inorganic film, such as a silicon nitride layer, a silicon oxynitride layer, a silicon oxide layer, a titanium oxide layer, or an aluminum oxide layer.

The first electrodes TE and the second electrodes RE may be disposed on the first insulating layer SIL1. Each of the first electrodes TE and the second electrodes RE may not overlap with the first to third emission areas EA1, EA2, and EA3. Each of the first electrodes TE and the second electrodes RE may be formed as a single layer including (e.g., made of) molybdenum (Mo), titanium (Ti), copper (Cu), or aluminum (Al), or may be formed as a stacked structure of aluminum and titanium (e.g., Ti/Al/Ti), a stacked structure of aluminum and ITO (e.g., ITO/Al/ITO), an APC alloy, or a stacked structure of an APC alloy and ITO (e.g., ITO/APC/ITO).

The second insulating layer SIL2 may cover the first electrodes TE, the second electrodes RE, and the first insulating layer SIL1. The second insulating layer SIL2 may have insulating and optical functions. The second insulating layer SIL2 may include (e.g., may be made of) at least one of the materials described above for the first insulating layer SIL1.

In FIG. 8, the bridge electrode CE is illustrated as being formed at a layer below (e.g., underneath) the first electrode TE and the second electrode RE, but the present disclosure is not limited thereto. For example, the bridge electrode CE may be formed at a layer above the first electrode TE and the second electrode RE.

Figure 9:
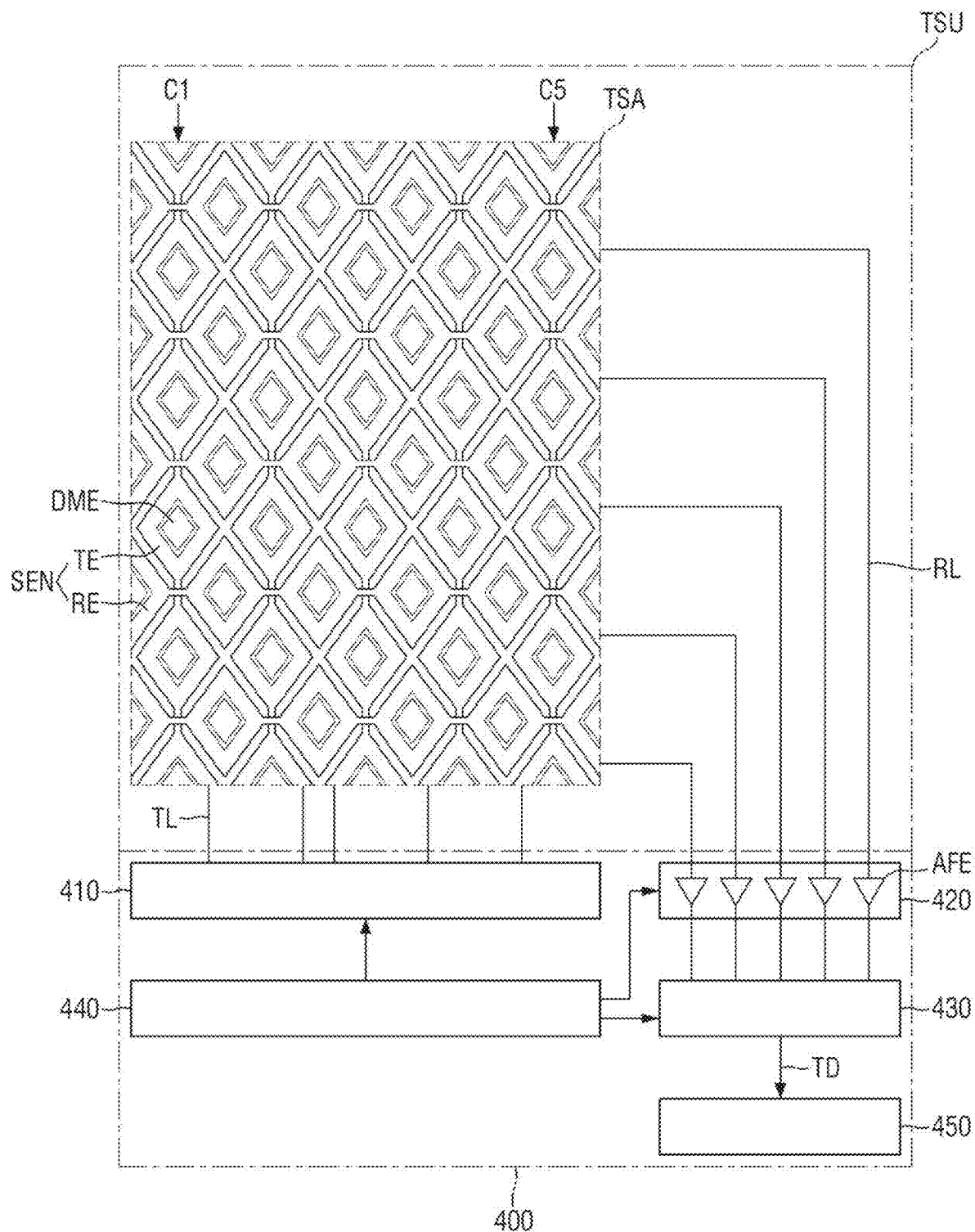
FIG. 9 is a schematic block diagram illustrating components of a touch unit and a touch driving unit according to an embodiment.

FIG. 9 is a schematic block diagram illustrating components of a touch unit and a touch driving unit according to an embodiment.

Referring to FIG. 9, the display device 10 may include a touch unit (e.g., a touch layer) TSU and a touch driving circuit 400. The touch unit TSU illustrated in FIG. 9 is the same or substantially the same as the touch unit TSU described above with reference to FIGS. 2 to 8, and thus, redundant description thereof may not be repeated.

The touch driving circuit 400 includes a driving signal output unit (e.g., a driving signal output circuit) 410, a sensing circuit unit (e.g., a sensing circuit) 420, an analog-to-digital conversion unit (e.g., an analog-to-digital converter) 430, a touch control unit (e.g., a touch controller) 440, and a touch data compensation unit (e.g., a touch data compensator) 450.

The driving signal output unit 410 outputs touch driving signals to the first electrodes TE through the touch driving lines TL. The touch driving signal may be a signal having the form of a plurality of pulses.

The driving signal output unit 410 may output touch driving signals to the touch driving lines TL in a suitable order (e.g., a predetermined order). For example, the driving signal output unit 410 may sequentially output the touch driving signals to the first electrodes TE of a first column C1 disposed on the leftmost side of the touch sensing area TSA to the first electrode TE of a fifth column C5 disposed on the rightmost side of the touch sensing area TSA.

The sensing circuit unit 420 may be connected to the second electrodes RE through the touch sensing lines RL. The sensing circuit unit 420 may sense charge change amounts in a mutual capacitance of touch nodes corresponding to intersection portions (e.g., crossing portions) between the first electrodes TE and the second electrodes RE through the touch sensing lines RL.

The sensing circuit unit 420 may include operational amplifiers AFE for sensing the charge change amounts in the mutual capacitance of the touch nodes. The operational amplifiers AFE may be connected to the touch sensing lines RL in a one-to-one manner. The operational amplifiers AFE may amplify raw data input in an analog form.

The analog-to-digital conversion unit 430 converts each of the output voltages of the operational amplifiers AFE of the sensing circuit unit 420 into touch sensing data TD, which is digital data.

The touch control unit 440 controls driving timings of the driving signal output unit 410, the sensing circuit unit 420, and the analog-to-digital conversion unit 430. The touch control unit 440 may output a timing signal for synchronization between the driving signal output unit 410, the sensing circuit unit 420, and the analog-to-digital conversion unit 430 to each of the driving signal output unit 410, the sensing circuit unit 420, and the analog-to-digital conversion unit 430.

The touch data compensation unit 450 receives the touch sensing data TD sensed from all touch nodes in the touch sensing area TSA from the analog-to-digital conversion unit 430. The touch data compensation unit 450 analyzes the touch sensing data TD to calculate a touch area ratio, and compensates for the touch sensing data TD according to the touch area ratio.

With the display device 10 and a mobile electronic device including the same according to some embodiments, it may be possible to decrease a peak-to-average ratio (PAPR) value, which may be a noise influence of the touch driving signals output from the touch driving unit (e.g., the touch driving circuit 400 of FIG. 9) on the display unit DU displaying a screen. As such, the touch driving unit (e.g., the touch driving circuit 400 of FIG. 9) according to some embodiments generates the touch driving signals by a multi-code multi-frequency driving method (MC-MFDM), and makes frequencies and codes of the touch driving signals assigned to the plurality of first electrodes TE different from each other.

In addition, the touch driving unit (e.g., the touch driving circuit 400 of FIG. 9) according to some embodiments converts phases of the touch driving unit signals in consideration of a point (e.g., only a point) where a maximum voltage of a composite signal occurs during calculation in order to decrease complexity. Further, the touch driving unit (e.g., the touch driving circuit 400 of FIG. 9) performs a max down algorithm that iterates the above calculation as a whole in order to secure PAPR decrease performance.

When the touch driving signals are output by the MC-MFDM, a sudden change in a boundary of a code symbol may cause instability of the signals and may impair orthogonality of the signals. As such, in some embodiments, the touch driving unit (e.g., the touch driving circuit 400 of FIG. 9) applies a cyclic extension method of setting guard periods by extending the touch driving signal by a ratio (e.g., a predetermined ratio) before and after each period of the touch driving signals. In addition, the touch driving unit (e.g., the touch driving circuit 400 of FIG. 9) prevents or substantially prevents the touch driving signal from spreading to a frequency domain and improves an electromagnetic interference (EMI), by applying a smoothing function when applying the cyclic extension method.

Hereinafter, the touch driving unit (e.g., the touch driving circuit 400 of FIG. 9) that outputs the touch driving signals by the MC-MFDM, performs the max down algorithm that iterates the above calculation as a whole in order to secure the PAPR decrease performance, and transforms partial periods (e.g. guard periods) of the touch driving signals according to the cyclic extension method and the smoothing function, as described above, will be described in more detail.

Figure 10:
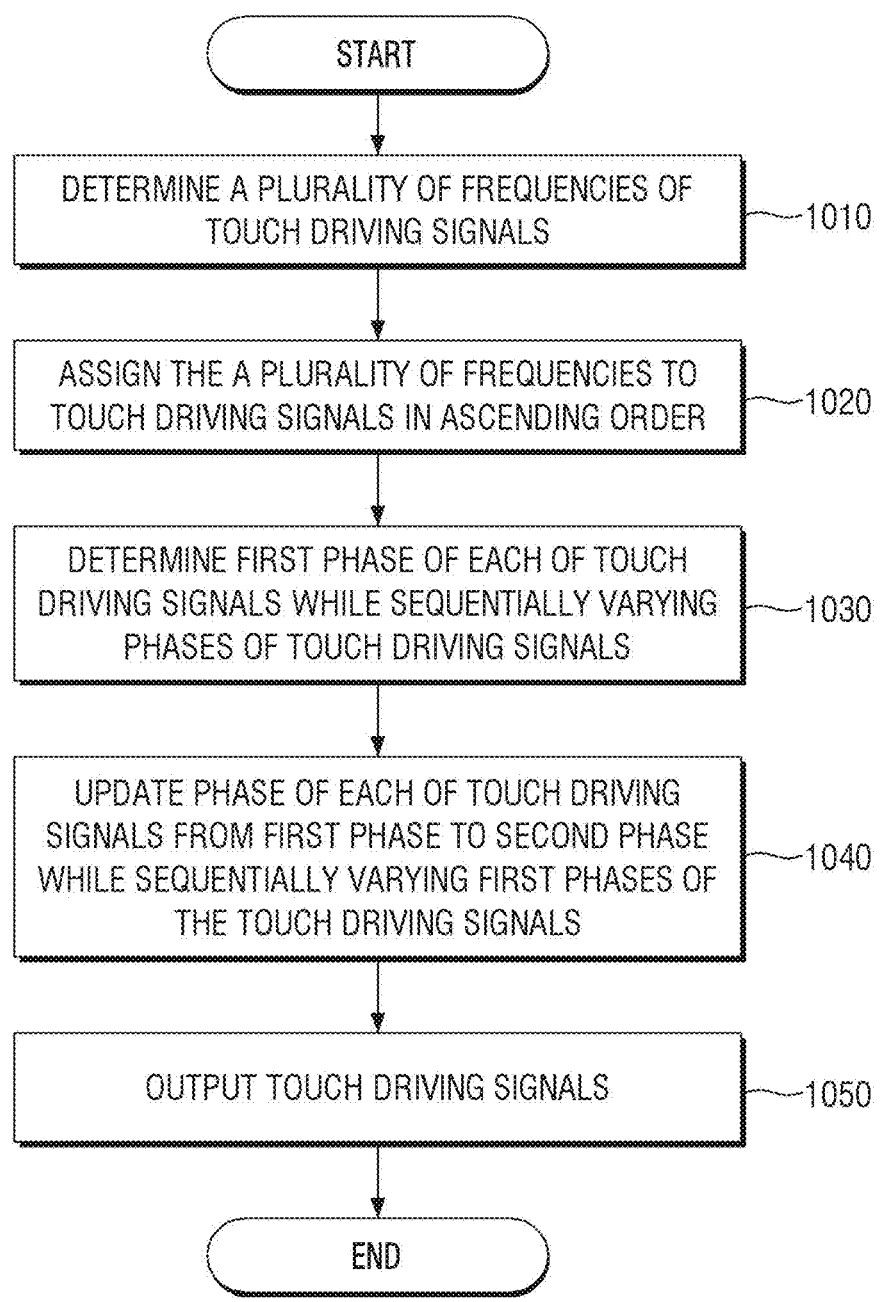
FIG. 10 is a flowchart illustrating operations of the touch driving unit according to an embodiment.
Figure 11A:
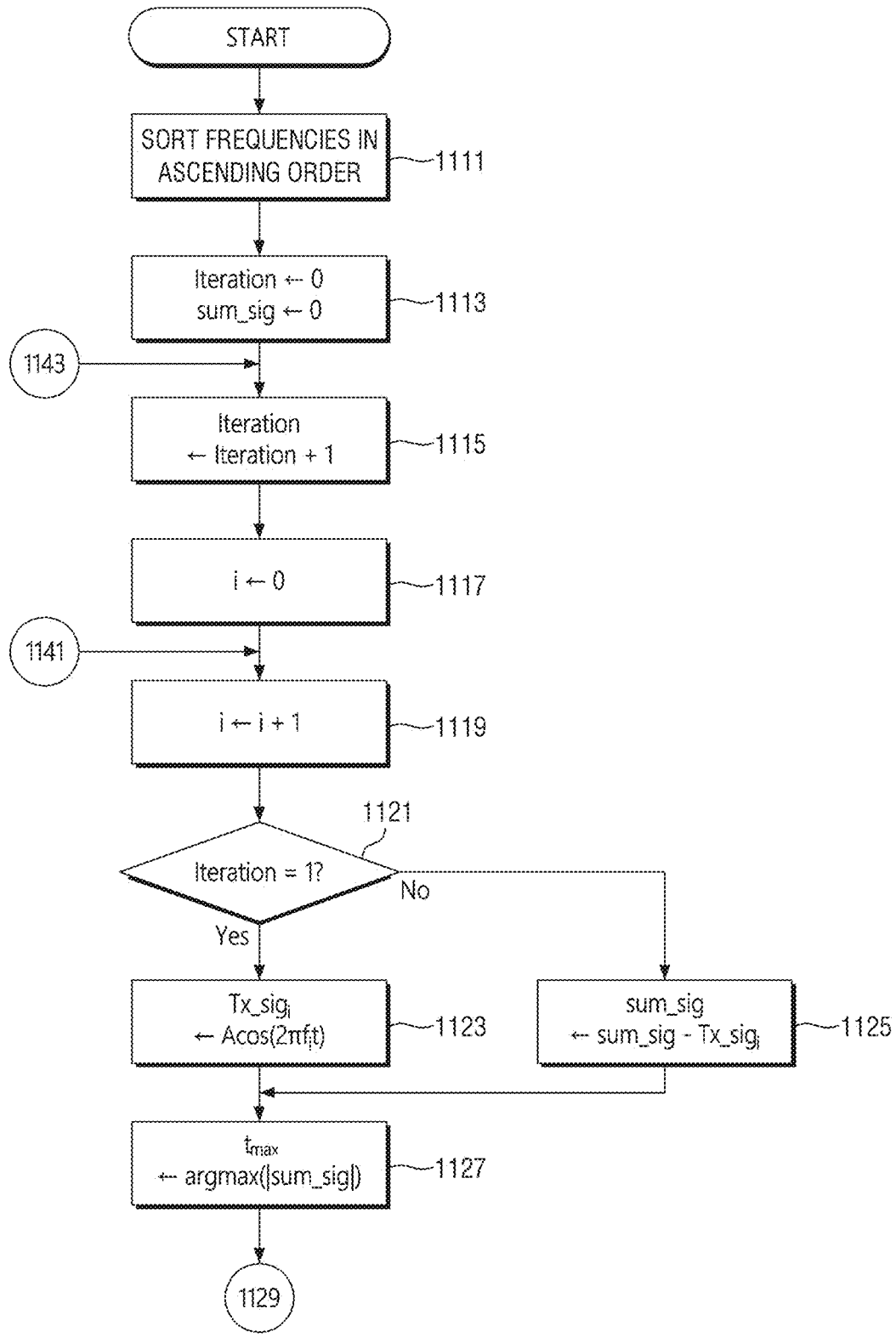
FIGS. 11A and 11B are flowcharts illustrating operations of the touch driving unit according to an embodiment.
Figure 11B:
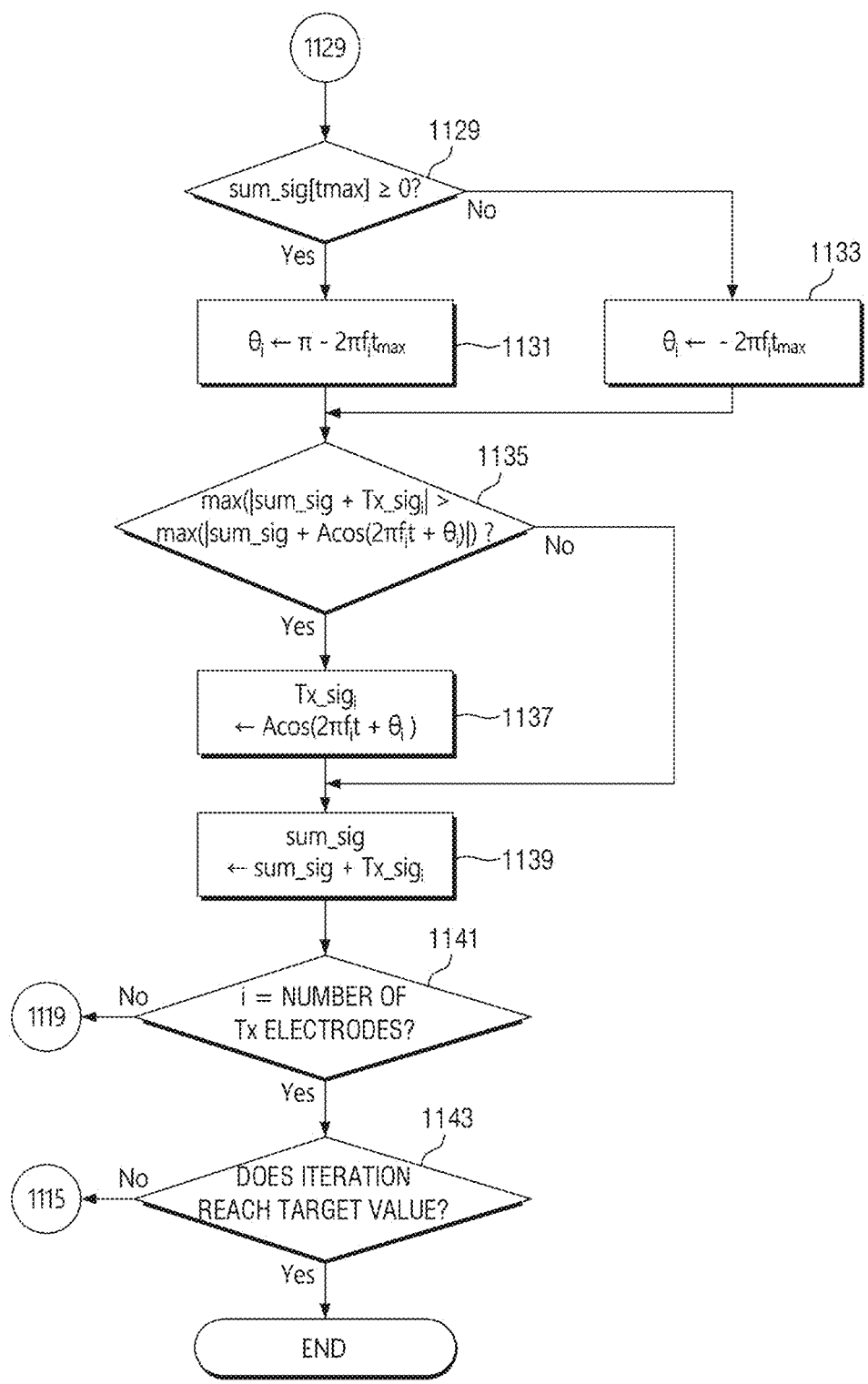

FIG. 10 is a flowchart illustrating operations of the touch driving unit according to an embodiment. FIGS. 11A and 11B are flowcharts illustrating operations of the touch driving unit according to an embodiment.

For convenience, a max down algorithm described in more detail below may be described on the basis of an MC-MFDM in which the number of code symbols is 1, but the present disclosure is not limited thereto. For example, the max down algorithm according to an embodiment may also be applied to an MC-MFDM in which the number of code symbols is plural (e.g., more than 1).

Operations of the touch driving unit described in more detail hereinafter with reference to FIGS. 10 to 11B may be performed by the touch driving circuit 400 described above with reference to FIGS. 1 to 9, but the present disclosure is not limited thereto. For example, the operations described in more detail hereinafter in connection with FIGS. 10 to 11B may be operations performed and/or controlled by the display driving circuit 200 or the "host", such as the application processor.

Referring to FIG. 10, the method may start, and the touch driving unit (e.g., the touch driving circuit 400 of FIG. 9) according to an embodiment determines a plurality of frequencies of touch driving signals at operation 1010 to be supplied to a plurality of Tx electrodes (e.g., TE in FIG. 9). The plurality of frequencies may be frequencies that are determined or set according to an orthogonal frequency division multiplexing (OFDM) method. For example, the plurality of frequencies may be determined or set so that their phases are orthogonal to each other.

The operation 1010 of FIG. 10 may be related to an operation 1111 of FIG. 11A. For example, referring to the operation 1111 of FIG. 11A, the touch driving unit may sort the frequencies in ascending order.

The touch driving unit (e.g., the touch driving circuit 400 of FIG. 9) according to an embodiment may assign the plurality of frequencies to the touch driving signals in ascending order at operation 1020.

When a range of a frequency usable by the plurality of Tx electrodes is determined, the touch driving unit may sort the frequencies in ascending order, and may assign the sorted frequencies to the respective Tx electrodes TE. For example, in some embodiments, a signal assigned to an i-th Tx electrode TE may be defined as "Tx_sig$_i$". In this case, the signal "Tx_sig$_i$" assigned to the i-th Tx electrode TE may be defined by Equation 1.

$$\text{Tx\_sig}_i = A \cos(2\pi f_i t + \theta_i) \quad \text{Equation 1}$$

In Equation 1, "$\theta_i$" is a phase of the i-th touch driving signal.

The touch driving unit (e.g., the touch driving circuit 400 of FIG. 9) according to an embodiment may determine a first phase of each of the touch driving signals while sequentially varying phases of the touch driving signals at operation 1030. The touch driving unit may sequentially add the touch driving signals to be supplied to the Tx electrodes TE. For example, in some embodiments, the sum of the added touch driving signals may be defined as "sum_sig". In this case, the sum of the touch driving signals may be defined by Equation 2.

$$\text{sum\_sig} = \sum_{j=1}^{i} \text{Tx\_sig}_j \quad \text{Equation 2}$$

In Equation 2, the total number of output channels corresponding to the Tx electrodes TE in a one-to-one manner is assumed to be i.

When the max down algorithm according to an embodiment is first executed, a signal having a phase of 0 is assigned to "Tx_sig$_1$", which is a first touch driving signal, and a signal assigned to a first Tx electrode TE is added to sum_sig having an initial value of 0. Accordingly, when the signal assigned to the first Tx electrode TE is added to sum_sig having the initial value of 0, the sum of the touch driving signals may be defined by Equation 3.

$$\text{sum\_sig} = \text{Tx\_sig}_1 = A \cos(2\pi f_1 t) \quad \text{Equation 3}$$

Thereafter, a touch driving signal to be input to a second Tx electrode TE is determined while its phase is varying, and the touch driving signal to be input to the second Tx electrode TE is determined to include a phase that decreases a PAPR. Similarly, a touch driving signal to be input to a third Tx electrode TE is determined while its phase is varying, and the touch driving signal to be input to the third Tx electrode TE is determined to include a phase that decreases the PAPR. In this way, phases of the touch driving signals may sequentially vary, and the touch driving signals may be determined to include phase values that decreases the PAPR.

The PAPR may be defined by Equation 4.

$$PAPR = 10 \log_{10} \frac{\max s(t)^2}{\frac{1}{T}\int_0^T s(t)^2 dt}, \, o \le t \le T \quad \text{Equation 4}$$

Referring to Equation 4, the PAPR is a ratio between a maximum power and an average power of the sum of the touch driving signals. When a frequency and a magnitude of the touch driving signal are fixed, only the phase of the touch driving signal may be changed, and when the touch driving signal is added, a magnitude of the average power may be the same (e.g., may always be the same). Accordingly, PAPR values may be compared with each other by confirming a magnitude of "max(|sum_sig|)", which is the maximum power of the sum of the touch driving signals. The touch driving unit according to an embodiment may perform an operation of varying a phase of each touch driving signal so as to decrease a calculated value corresponding to the maximum power of the sum of the touch driving signals, which may be ultimately considered as an operation of decreasing the PAPR.

$$t_{max} = \text{argmax}(|\text{sum\_sig}|) \quad \text{Equation 5}$$

Referring to Equation 5, assuming that an index having the greatest value of absolute values of sum_sig is "$t_{max}$", a touch driving signal "Tx_sig$_i$", which is a touch driving signal to be added next, is determined to be phase-shifted to have a peak value with an opposite sign to sum_sig at $t_{max}$, by the touch driving unit.

Therefore, Tx_sig$_i$ determined in the case of $t_{max}$ may be defined by Equation 6 and Equation 7. For example, Equation 6 represents Tx_sig$_i$ determined when sum_sig at $t_{max}$ is greater than or equal to 0, and Equation 7 represents Tx_sig$_i$ determined when sum_sig at $t_{max}$ is smaller than 0.

$$\text{Tx\_sig}_i[t_{max}] = \quad \text{if sum\_sig}[t_{max}] \ge 0 \quad \text{Equation 6}$$
$$A \cos(2\pi f_i t_{max} + \theta_i) = -A,$$

$$\text{Tx\_sig}_i[t_{max}] = \quad \text{if sum\_sig}[t_{max}] < 0 \quad \text{Equation 7}$$
$$A \cos(2\pi f_i t_{max} + \theta_i) = A,$$

According to Equation 6 and Equation 7, a phase ($\theta_i$) of Tx_sig$_i$, which is each of the touch driving signals, may be defined by Equation 8 and Equation 9. For example, Equation 8 represents a phase of Tx_sig$_i$ determined when sum_sig at $t_{max}$ is greater than or equal to 0, and Equation 9 represents a phase of $Tx\_sig_i$ determined when sum_sig at $t_{max}$ is smaller than 0.

$$\theta_i = \pi - 2\pi f_i t_{max}, \text{ if sum\_sig}[t_{max}] \geq 0 \quad \text{Equation 8}$$

$$\theta_i = -2\pi f_i t_{max}, \text{ if sum\_sig}[t_{max}] < 0 \quad \text{Equation 9}$$

The touch driving unit according to an embodiment may decrease a peak value of $t_{max}$ according to sum_sig while shifting the phase ($\theta_i$) of each touch driving signal by performing the operations as described above. However, because the touch driving signal may be a signal having periodicity, a peak value of $t_{max}$ at another phase may be increased even though the peak value of $t_{max}$ is decreased.

$$\max(|\text{sum\_sig} + A\cos(2\pi f_i t + \theta_i)|) < \quad \text{Equation 10}$$
$$\max(|\text{sum\_sig} + A\cos(2\pi f_i t)|)$$

Accordingly, the touch driving unit according to an embodiment may compare a peak value of a touch driving signal obtained by adding $Tx\_sig_i$ having a phase that is shifted by $\theta_i$ to sum_sig and a peak value of a touch driving signal obtained by adding $Tx\_sig_i$ having a phase that is not shifted to sum_sig with each other, as represented in Equation 10. For example, the touch driving unit may determine whether or not the peak value of the touch driving signal obtained by adding $Tx\_sig_i$ having a phase that is shifted by $\theta_i$ to sum_sig is smaller than the peak value of the touch driving signal obtained by adding $Tx\_sig_i$ having a phase that is not shifted to sum_sig. When the peak value of the touch driving signal obtained by adding $Tx\_sig_i$ having a phase that is shifted by $\theta_i$ to sum_sig is smaller than the peak value of the touch driving signal obtained by adding $Tx\_sig_i$ having a phase that is not shifted to sum_sig, the touch driving unit applies a phase shift by $\theta_i$ to $Tx\_sig_i$, which is the corresponding touch driving signal.

In other words, when Equation 10 is determined to be true, the touch driving unit determines $Tx\_sig_i$, which is the touch driving signal, according to Equation 11. In addition, when Equation 10 is determined to be false, the touch driving unit determines $Tx\_sig_i$, which is the touch driving signal, according to Equation 12.

$$Tx\_sig_i = A\cos(2\pi f_i t + \theta_i) \quad \text{Equation 11}$$

$$Tx\_sig_i = A\cos(2\pi f_i t) \quad \text{Equation 12}$$

The touch driving unit updates sum_sig by adding $Tx\_sig_i$ determined according to Equation 11 or Equation 12 to the existing accumulated sum_sig. As such, the updated sum_sig may be defined by Equation 13.

$$\text{sum\_sig} \leftarrow \text{sum\_sig} + Tx\_sig_i \quad \text{Equation 13}$$

When the phases of all of the touch driving signals are sequentially varied as described above, it may be defined that the max down algorithm has been performed once. In addition, when the max down algorithm has been performed once, a phase assigned to each touch driving signal is defined as a first phase. For example, the first phase may refer to a phase of each touch driving signal determined for the first time while sequentially varying phase values of the first touch driving signal to the last touch driving signal so as to include a phase value that decreases the PAPR.

As used herein, a factor representing the number of times the max down algorithm is performed is defined as an "iteration". For example, when the max down algorithm is performed once to determine the first phase for the first time while sequentially varying the phase values of the first touch driving signal to the last touch driving signal, it may be considered that an iteration 1 has been completed.

Operation 1030 of FIG. 10 may be related to operation 1113 to operation 1127 illustrated in FIG. 11A, and operation 1129 to operation 1141 illustrated in FIG. 11B. Hereinafter, operation 1030 of FIG. 10, operation 1113 to operation 1127 of FIG. 11A, and operation 1129 to operation 1141 of FIG. 11B will be described in more detail in relation to each other.

In operation 1113, the touch driving unit may configure (e.g., may set) each of sum_sig and iteration to 0.

In operation 1115, the touch driving unit may increase an iteration value by 1.

In operation 1117, the touch driving unit may configure (e.g., may set) i, which is a factor corresponding to the numbering of the touch driving signals to be supplied to the Tx electrodes TE, to 0. For example, when i is 1, a touch driving signal is to be supplied to the first Tx electrode TE. As another example, when i is 2, a touch driving signal is to be supplied to the second Tx electrode TE.

In operation 1119, the touch driving unit may increase i, which is a factor corresponding to the numbering of the touch driving signals, by 1.

In operation 1121, the touch driving unit may determine whether or not an iteration value is 1. The touch driving unit performs operation 1123 when the iteration value is 1, and performs operation 1125 otherwise.

In operation 1123, the touch driving unit adds a signal assigned to the first Tx electrode TE to sum_sig having an initial value of 0. Accordingly, as described above, when the signal assigned to the first Tx electrode TE is added to sum_sig having the initial value of 0, the sum of the touch driving signals may be defined by Equation 3.

In operation 1125, when the iteration value is greater than or equal to 2, the touch driving unit excludes $Tx\_sig_i$ from sum_sig, as represented in Equation 14, because the sum of all touch driving signals has already been applied to sum_sig.

$$\text{sum\_sig} \leftarrow \text{sum\_sig} - Tx\_sig_i \quad \text{Equation 14}$$

In operation 1127, the touch driving unit determines "$t_{max}$", which is the index having the greatest value of the absolute values of sum_sig.

In operation 1129, the touch driving unit determines whether or not sum_sig at $t_{max}$ is greater than or equal to 0. The touch driving unit performs operation 1131 when sum_sig at $t_{max}$ is greater than or equal to 0, and performs operation 1133 otherwise.

In operation 1131, the touch driving unit defines $Tx\_sig_i$ determined when sum_sig at $t_{max}$ is greater than or equal to 0, as represented in Equation 8.

In operation 1133, the touch driving unit defines $Tx\_sig_i$ determined when sum_sig at $t_{max}$ is smaller than 0, as represented in Equation 9.

In operation 1135, the touch driving unit may compare the peak value of the touch driving signal obtained by adding Tx_sig$_i$ having a phase that is shifted by θ$_i$ to sum_sig and the peak value of the touch driving signal obtained by adding Tx_sig$_i$ having a phase that is not shifted to sum_sig with each other, as represented in Equation 10. The touch driving unit may perform operation 1137 when Equation 10 is true, and may perform operation 1139 otherwise.

In operation 1137, the touch driving unit determines whether or not the peak value of the touch driving signal obtained by adding Tx_sig$_i$ having a phase that is shifted by θ$_i$ to sum_sig is smaller than the peak value of the touch driving signal obtained by adding Tx_sig$_i$ having a phase that is not shifted to sum_sig. When the peak value of the touch driving signal obtained by adding Tx_sig$_i$ having a phase that is shifted by θ$_i$ to sum_sig is smaller than the peak value of the touch driving signal obtained by adding Tx_sig$_i$ having a phase that is not shifted to sum_sig, the touch driving unit applies a phase shift by θ$_i$ to Tx_sig$_i$, which is the corresponding touch driving signal.

In other words, when Equation 10 is determined to be true, the touch driving unit determines Tx_sig$_i$, which is the touch driving signal, according to Equation 11.

In addition, in operation 1139, when Equation 10 is determined to be false, the touch driving unit determines Tx_sig$_i$, which is the touch driving signal, according to Equation 12.

In operation 1141, the touch driving unit confirms whether or not i corresponds to the total number of Tx electrodes. The touch driving unit performs operation 1143 when i corresponds to the total number of Tx electrodes, and returns to operation 1119 and again performs operation 1119 to operation 1139 otherwise.

In operation 1040, the touch driving unit (e.g., the touch driving circuit 400 of FIG. 9) according to an embodiment may update the phase of each of the touch driving signals from the first phase to a second phase, while sequentially varying the determined first phases of the touch driving signals again.

According to an embodiment, the touch driving unit lowers the PAPR value by configuring (e.g., by setting) the number of times the max down algorithm is performed to 2 or more. As such, the touch driving unit calculates the second phase that may lower the PAPR, while sequentially varying the first phases of the respective preset touch driving signals again after the performance of the max down algorithm corresponding to iteration 1 is completed.

When iteration is 2 or more, the touch driving unit determines the index ("t$_{max}$") having the greatest value of the absolute values of "sum_sig" again, and determines the second phase, which is a new phase. As used herein, the second phase, which is the new phase, is defined as "θ'$_i$".

The touch driving unit may compare a peak value of a touch driving signal obtained by adding Tx_sig$_i$ having a phase that is shifted by θ'$_i$ to sum_sig and a peak value of a touch driving signal obtained by adding Tx_sig$_i$ having a phase that is not shifted to sum_sig with each other, as represented in Equation 15.

$$\max(|\text{sum\_sig} + A\cos(2\pi f_i t + \theta'_i)|) < \quad\quad \text{Equation 15}$$
$$\max(|\text{sum\_sig} + Tx + sig_i|)$$

For example, the touch driving unit determines whether or not the peak value of the touch driving signal obtained by adding Tx_sig$_i$ having a phase that is shifted by θ'$_i$ to sum_sig is smaller than the peak value of the touch driving signal obtained by adding Tx_sig$_i$ having a phase that is not shifted to sum_sig.

When a result of Equation 15 is true, the touch driving unit determines Tx_sig$_i$ as represented in Equation 16.

$$\text{Tx\_sig} \leftarrow A\cos(2\pi f_i t + \theta'_i) \quad\quad \text{Equation 16}$$

The touch driving unit determines Tx_sig$_i$ to which the second phase is applied with respect to the touch driving signals corresponding to the remaining Tx electrodes by the same method as that described above, and completes the performance of an iteration and a max down algorithm of a corresponding round.

The touch driving unit (e.g., the touch driving circuit 400 of FIG. 9) according to an embodiment may output the touch driving signals at operation 1050 to the plurality of first electrodes, and the method may end.

Operation 1040 and operation 1050 of FIG. 10 may be related to operation 1143 of FIG. 11B.

In operation 1143, the touch driving unit determines whether or not an iteration is a target value (e.g., a designated value). When the iteration reaches the target value (e.g., the designated value), the touch driving unit outputs the touch driving signals based on the frequency assigned to each of the touch driving signals and the finally determined second phase. When the iteration does not reach the target value (e.g., the designated value), the touch driving unit returns to operation 1115, and repeatedly performs operation 1115 to operation 1141.

Figure 12:
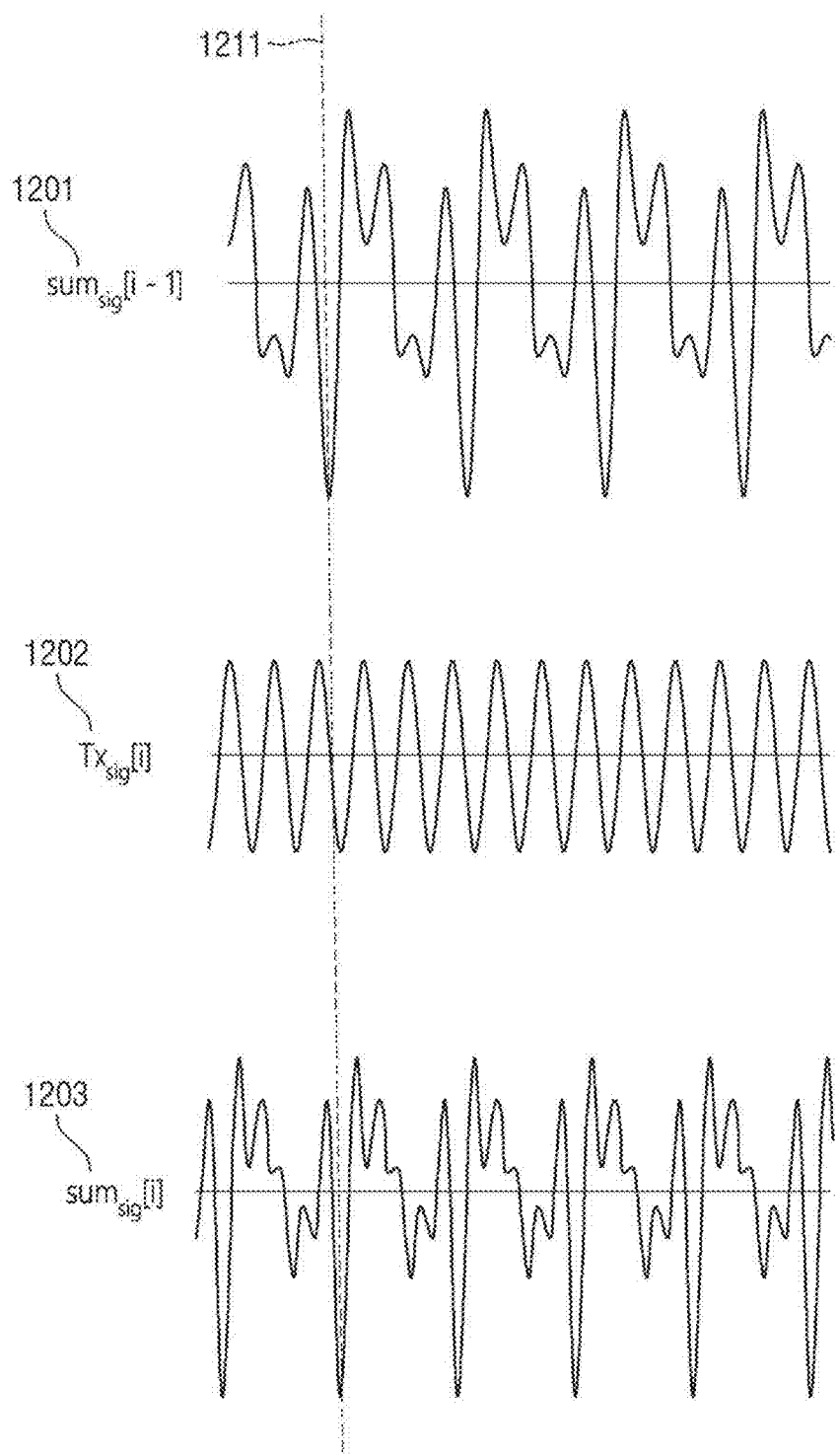
FIG. 12 is a diagram illustrating an example of a cumulative value of peak-to-average ratio (PAPR) values before shifting a phase of a touch driving signal according to an embodiment.
Figure 13:
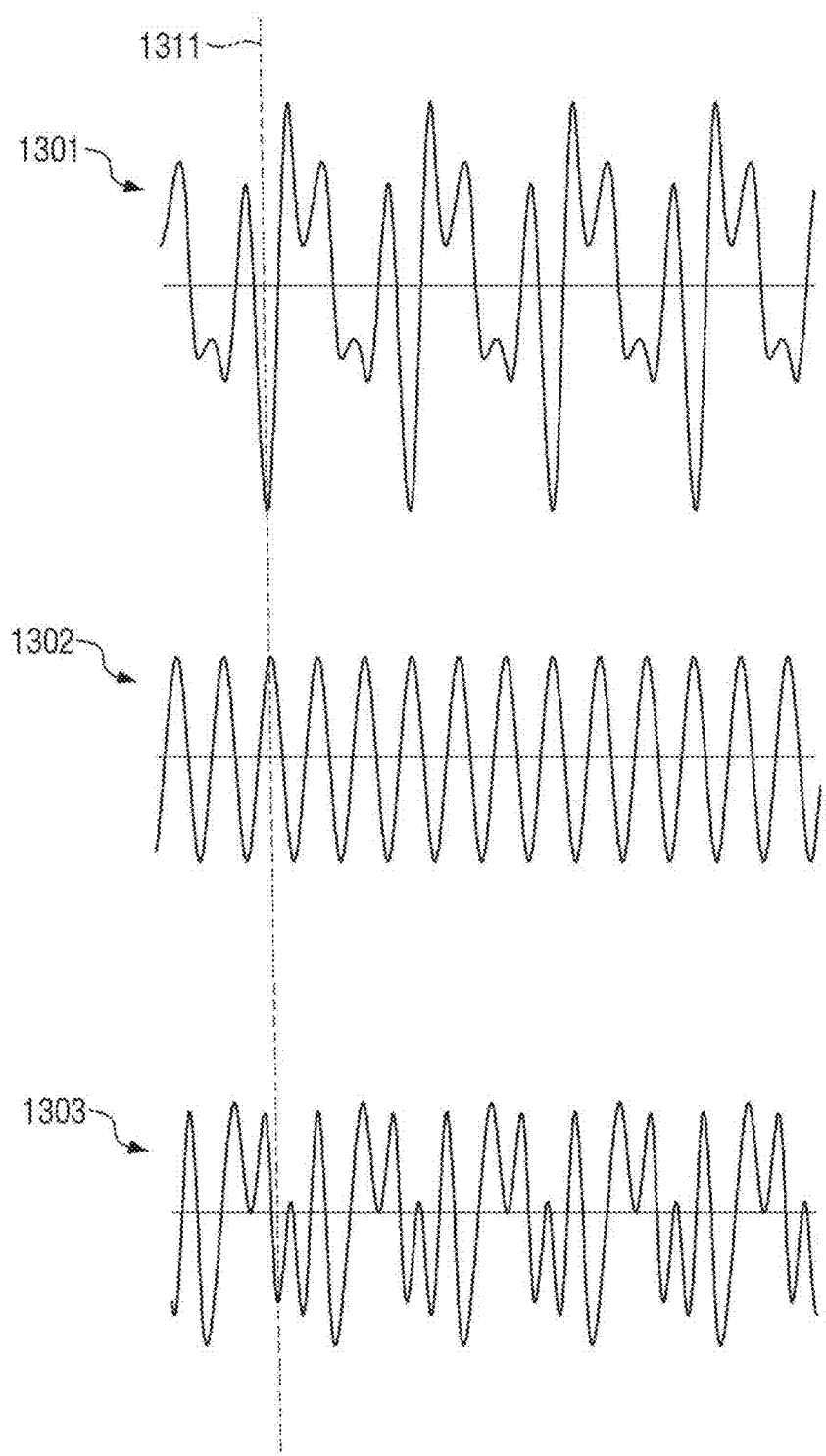
FIG. 13 is a diagram illustrating an example of a cumulative value of PAPR values after shifting the phase of the touch driving signal according to an embodiment.

FIG. 12 is a diagram illustrating an example of a cumulative value of PAPR values before shifting a phase of a touch driving signal according to an embodiment. FIG. 13 is a diagram illustrating an example of a cumulative value of PAPR values after shifting the phase of the touch driving signal according to an embodiment.

1201 in FIGS. 12 and 1301 in FIG. 13 denote a signal according to i−1-th sum_sig.

1202 in FIG. 12 denotes a signal according to i-th Tx_sig$_i$. A phase of the signal may be shifted as denoted by 1302 in FIG. 13.

1203 in FIG. 12 denotes a signal according to i-th sum_sig obtained by adding the signal according to i-th Tx_sig$_i$ to the signal according to i−1-th sum_sig. The signal is changed so that its peak decreases as denoted by 1303 in FIG. 13. This is because the phase of the signal according to i-th Tx_sig$_i$ has been shifted so that a peak value decreases, as denoted by 1302 in FIG. 13.

1211 in FIGS. 12 and 1311 in FIG. 13 denote a specific phase at which the signal according to i−1th sum_sig has a peak value.

When comparing FIGS. 12 and 13 with each other, as the phase of Tx_sig$_i$ added to the previous sum_sig is shifted as denoted by 1302, the peak value of 1303, which is the signal according to the i-th sum_sig, has decreased at the corresponding phase, and accordingly, it may be inferred that the PAPR may be decreased.

Figure 14:
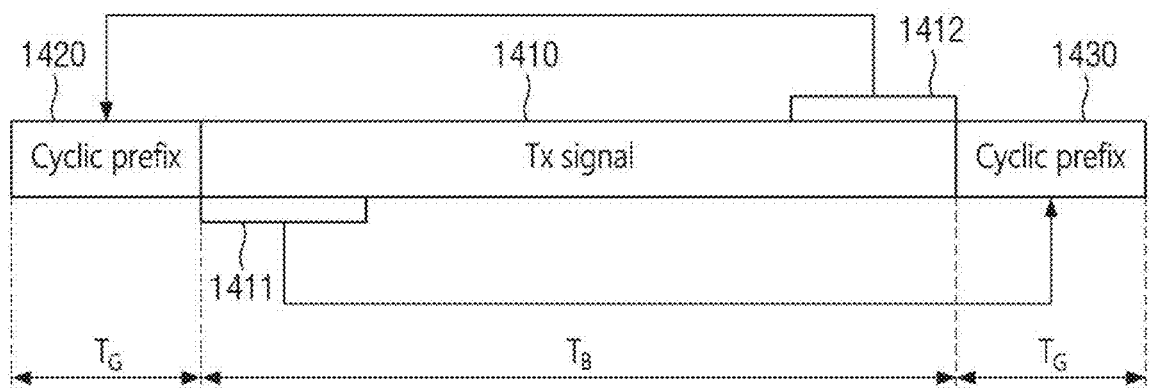
FIG. 14 is a conceptual diagram illustrating a cyclic extension method according to an embodiment.

FIG. 14 is a conceptual diagram illustrating a cyclic extension method according to an embodiment.

Referring to FIG. 14, the touch driving unit (e.g., the touch driving circuit 400 of FIG. 9) according to an embodiment assigns orthogonal codes to the touch driving signals according to a code division multiple access (CDMA) method. For example, the orthogonal codes may include data based on a Walsh code. The orthogonal codes are codes based on the CDMA method, and may include values of 1 or −1. Here, 1 may refer to a phase non-inversion, and −1 may refer to a phase inversion.

In the MC-MFDM using the orthogonal code (e.g. a complex code), a sudden change in the touch driving signal may occur at a boundary point where the code is converted. Accordingly, when the touch driving signal is output, a frequency range of the touch driving signal may be widened at the boundary point where the code is converted, and different responses may appear at each frequency, such that orthogonality of the signal may be destroyed or distortion of the signal may occur.

The touch driving unit according to an embodiment adds cyclic extensions, or in other words, guard periods, so as to prevent or substantially prevent the above. The touch driving unit may output a smoothing signal so as to prevent or substantially prevent interference between symbols in the guard period. For example, the touch driving unit generates a cyclic suffix signal 1430 by copying a signal of a first period 1411 of an original signal 1410, and attaching the copied signal to the rear of the original signal. The touch driving unit generates a cyclic prefix signal 1420 by copying a signal of a last period 1412 of the original signal 1410, and attaching the copied signal to the front of the original signal. For example, the touch driving unit generates the cyclic suffix signal 1430 attached to the rear of the original signal 1410 including symbols of the orthogonal codes by copying a first signal 1411 corresponding to a first symbol of the original signal 1410, and applying a roll-off factor (B) to the copied first signal 1411. In addition, the touch driving unit generates the cyclic prefix signal 1420 attached to the front of the original signal 1410 by copying a second signal 1412 corresponding to a last symbol of the original signal 1410, and applying the roll-off factor ($\beta$) to the copied second signal 1412.

In the present specification, when "$T_S$" is a total length of each of the touch driving signals, "$T_B$" is a length of the original signal, and "$T_G$" is a length of the cyclic suffix signal or the cyclic prefix signal, the total length of each of the touch driving signals may be defined by Equation 17.

$$T_S = T_B + 2T_G \quad \text{Equation 17}$$

Referring to Equation 17, as $T_G$ becomes greater, lengths of the guard periods 1420 and 1430 increase, and accordingly, the distortion of the touch driving signal decreases, but the total length ($T_S$) of each of the touch driving signals may increase.

Because a sudden change in a value of the touch driving signal within the guard period may increase an influence of noise, the touch driving unit may generate a smoothing signal to which a smoothing function is applied. The smoothing signal to which the smoothing function is applied may be defined by Equation 18. In Equation 18, $\beta$ is the roll-off factor.

$$H(x) = \begin{cases} 1, & |x| \le \frac{1-\beta}{2T} \\ \frac{1}{2}\left[1 + \cos\left(\frac{\pi T}{\beta}\left(|x| - \frac{1-\beta}{2T}\right)\right)\right], & \frac{1-\beta}{2T} < |x| \le \frac{1+\beta}{2T} \\ 0, & \text{otherwise} \end{cases} \quad \text{Equation 18}$$

Figure 15:
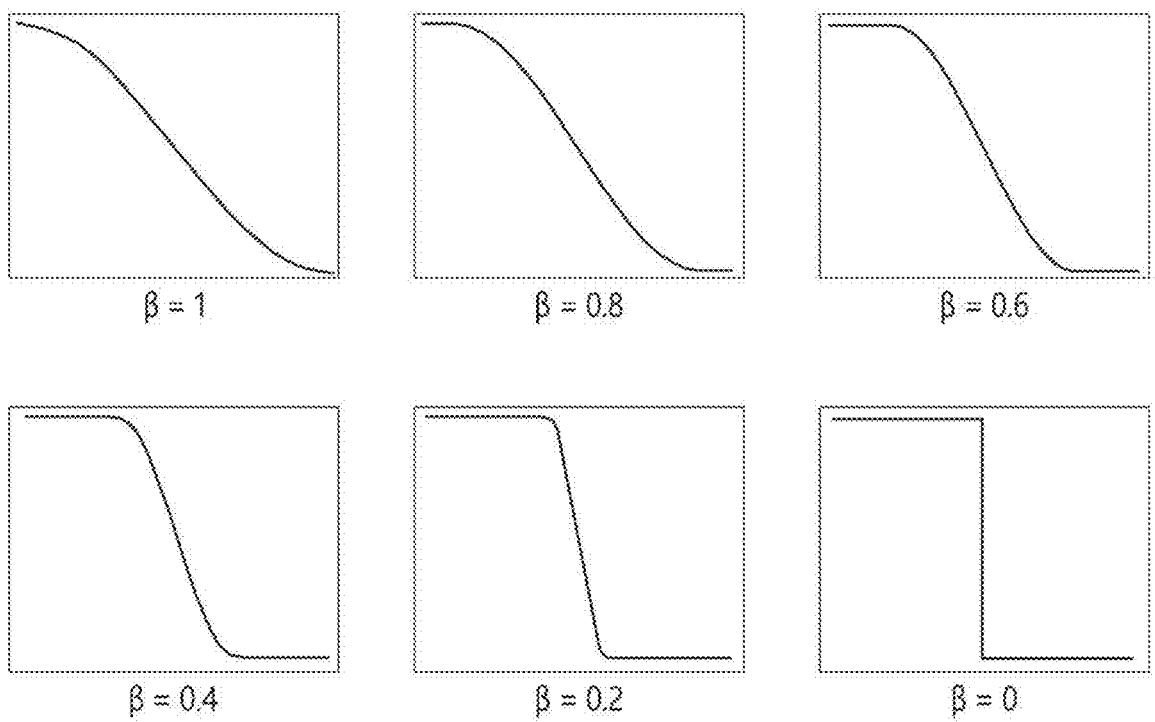
FIG. 15 illustrates graphs showing a change in a smoothing function according to a roll-off factor.
Figure 16:
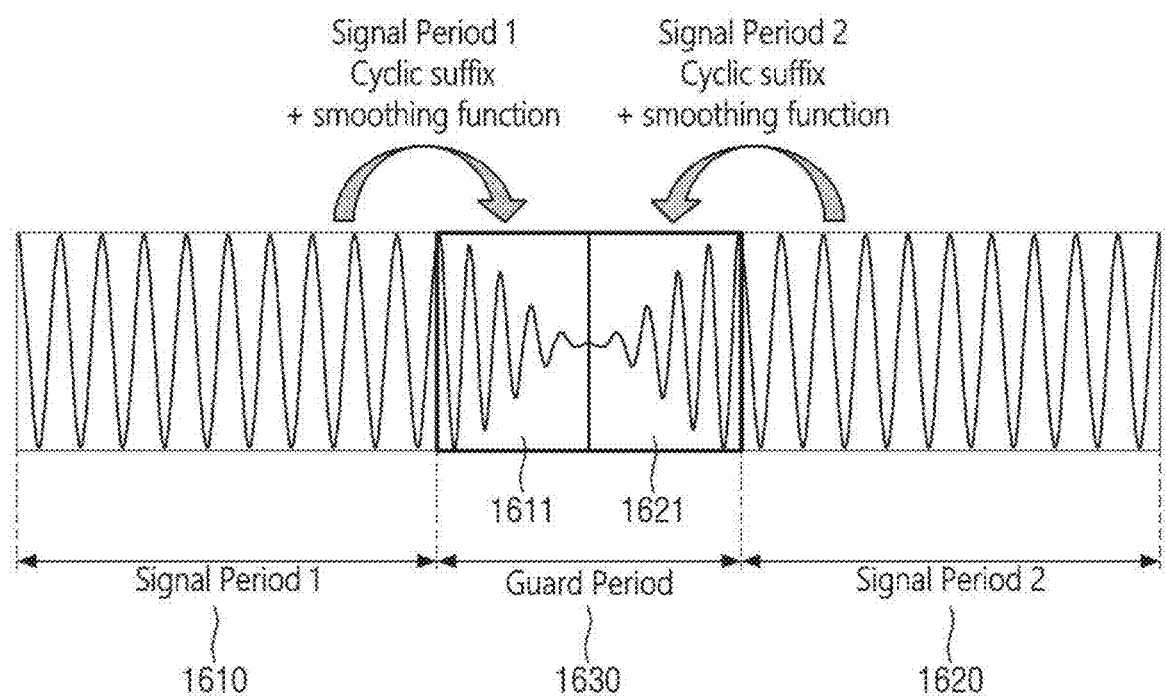
FIG. 16 is a diagram illustrating an example of a method of applying a cyclic extension & smoothing function according to an embodiment.

FIG. 15 illustrates graphs showing a change in a smoothing function according to a roll-off factor. FIG. 16 is a diagram illustrating an example of a method of applying a cyclic extension & smoothing function according to an embodiment.

Referring to FIGS. 15 and 16, the smoothing signal may be divided into an open period during which a received signal passes as it is according to the roll-off factor ($\beta$), a transition period during which a portion (e.g., only a portion) of the original signal passes based on a total length T of the signal and the roll-off factor ($\beta$), and a close period during which the signal is blocked (e.g., is completely blocked). A range of each period is determined according to the roll-off factor ($\beta$), and a range of the roll-off factor ($\beta$) may be configured (e.g., may be set) to a value between 0 and 1.

As illustrated in FIG. 15, as the value of the roll-off factor ($\beta$) is closer to 1, a range of the transition period increases, such that noise may be blocked in a wider frequency range.

FIG. 16 is a diagram illustrating an example of a touch driving signal to which both a cyclic extension and a smoothing function are finally applied. As illustrated in FIG. 16, the touch driving unit (e.g., the touch driving circuit 400 of FIG. 9) inserts a guard period 1630 into a boundary period transitioning from a first signal period 1610 including a first code to a second signal period 1620 including a second code. The touch driving unit outputs a cyclic suffix signal 1611 and a cyclic prefix signal 1621 in the guard period 1630. Accordingly, the touch driving unit may perform touch sensing in which distortion of the signal is blocked by removing a signal corresponding to the guard period by a receiver of the touch sensing signal, and confirming the original signal (e.g., only the original signal), which is the remaining signal.

Figure 17:
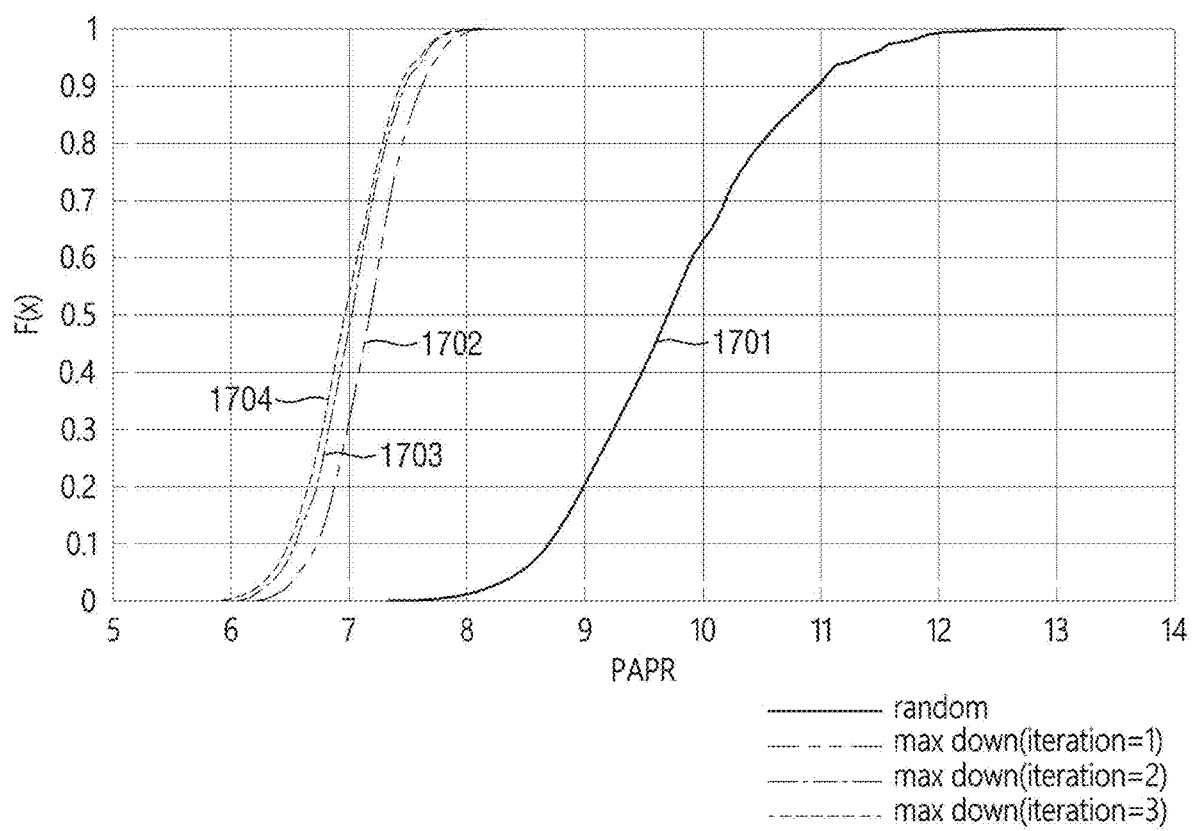
FIG. 17 is a graph comparing PAPRs according to the application of a max down algorithm according to iteration values.

FIG. 17 is a graph comparing PAPRs according to the application of a max down algorithm according to iteration values.

FIG. 17 illustrates PAPR measurement results obtained by iterating PARP measurements 1000 times when 48 of 128 frequencies are randomly selected and expressed as a cumulative distribution function.

1701 in FIG. 17 is a graph obtained by measuring a PAPR when the max down algorithm is not performed.

1702 in FIG. 17 is a graph obtained by measuring a PAPR as a result of performing the max down algorithm once, or in other words, when the iteration is 1.

1703 in FIG. 17 is a graph obtained by measuring a PAPR as a result of performing the max down algorithm twice, or in other words, when the iteration is 2.

1704 in FIG. 17 is a graph obtained by measuring a PAPR as a result of performing the max down algorithm three times, or in other words, when the iteration is 3.

Referring to FIG. 17, a great PAPR value appears when the max down algorithm is not performed (e.g., 1701), and a PAPR value decreases as the number of times the max down algorithm is performed increases.

Referring to a change in PAPR according to the number of times of the iteration of the max down algorithm, the PAPR value decreases as the iteration value increases, but a difference gradually decreases. Accordingly, in some embodiments the iteration may be configured (e.g., may be set) to about 3.

Figure 18:
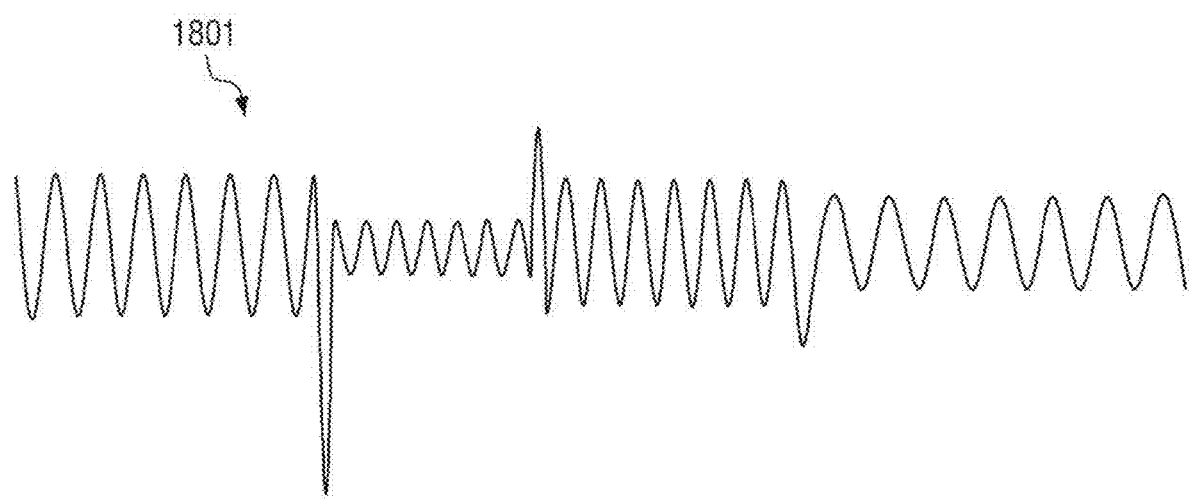
FIG. 18 is a diagram illustrating an example of an RX waveform before applying the cyclic extension method according to an embodiment.
Figure 19:
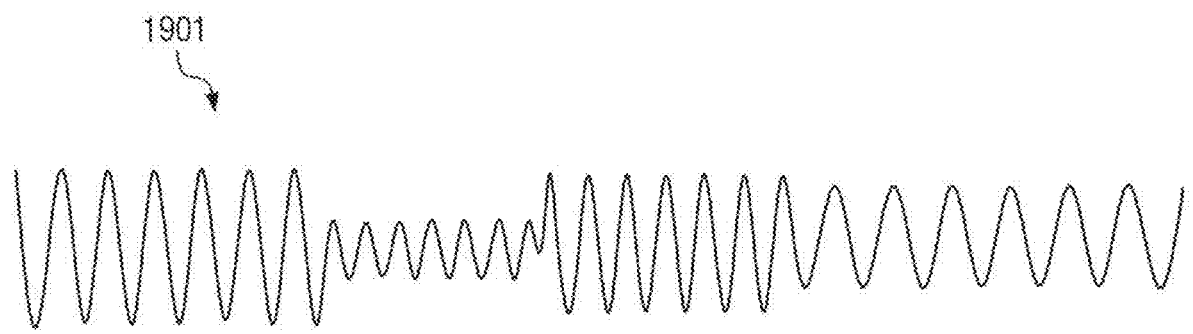
FIG. 19 is a diagram illustrating an example of an RX waveform after applying the cyclic extension method according to an embodiment.

FIG. 18 is a diagram illustrating an example of an RX waveform before applying the cyclic extension method according to an embodiment. FIG. 19 is a diagram illustrating an example of an RX waveform after applying the cyclic extension method according to an embodiment.

1801 in FIG. 18 denotes an RX waveform before applying the cyclic extension method.

1901 in FIG. 19 denotes an RX waveform after applying the cyclic extension method.

Referring to FIG. 18, when a complex code corresponding to a magnitude 4 is applied to the touch driving signal, in the RX waveform 1801 in which the cyclic extension method is not applied, orthogonality of the signal may be destroyed at a boundary point where a value of the code changes, such that a value completely different from the original signal may be instantaneously generated. Such a peak or distortion of the signal may cause a malfunction of a touch screen.

Referring to FIG. 19, when a complex code corresponding to a magnitude 4 is applied to the touch driving signal, in the RX waveform 1901 in which the cyclic extension method is applied, a peak or distortion of the signal decreases compared to the comparative example of FIG. 18.

Figure 20:
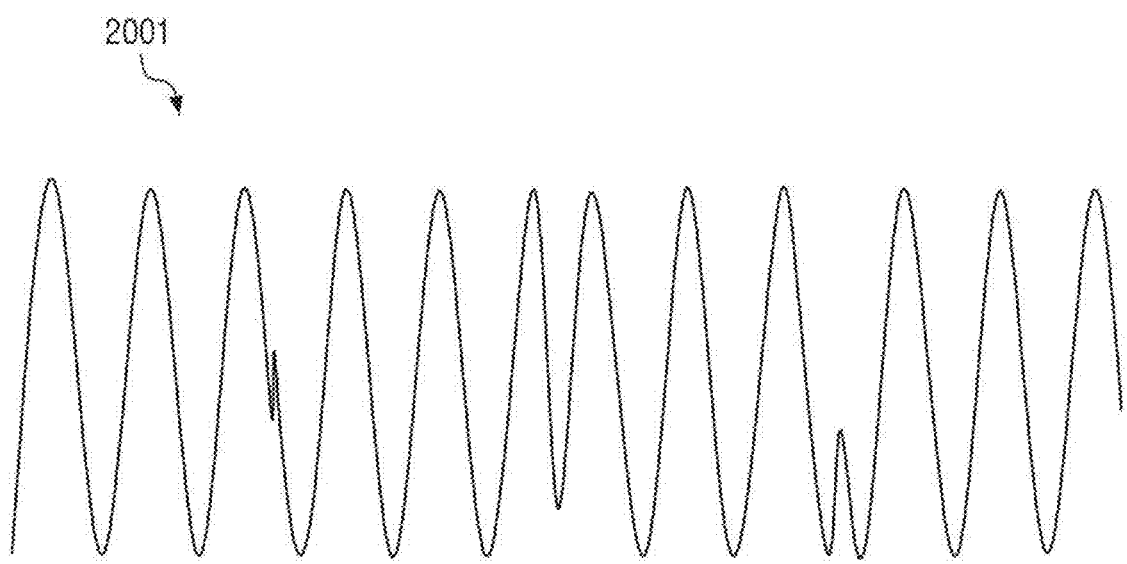
FIG. 20 is a diagram illustrating an example of a touch driving signal to which a smoothing function is not applied.
Figure 21:
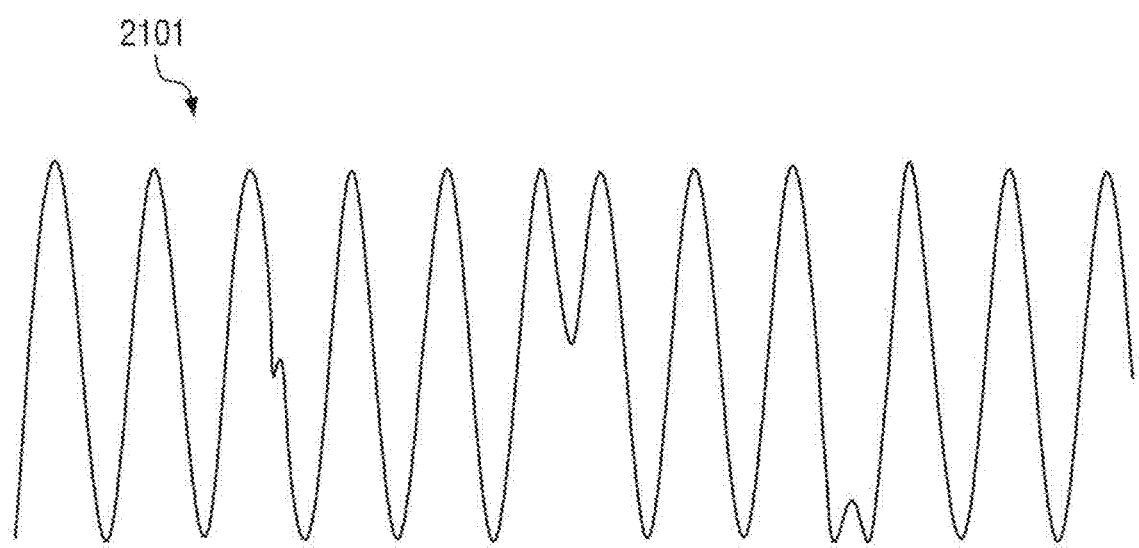
FIG. 21 is a diagram illustrating an example of a touch driving signal to which the smoothing function is applied according to an embodiment.

FIG. 20 is a diagram illustrating an example of a touch driving signal to which a smoothing function is not applied. FIG. 21 is a diagram illustrating an example of a touch driving signal to which the smoothing function is applied according to an embodiment.

2001 in FIG. 20 denotes a touch driving signal to which a smoothing function is not applied.

2101 in FIG. 21 denotes a touch driving signal to which the smoothing function is applied according to an embodiment.

In the case where the guard period is inserted by applying the cyclic extension to the touch driving signal to which the orthogonal code (e.g. the complex code) is applied, when the original signal is confirmed at a receiving end of the touch sensing signal, a correct signal in which the destruction of the orthogonality of the signal is prevented or substantially prevented and the distortion is not generated may be received.

However, as in an example of the touch driving signal 2001 in FIG. 20, when the smoothing function is not applied, a frequency band of an input signal may be widened at a boundary point of the orthogonal code.

As in an example of the touch driving signal 2101 of FIG. 21, in the touch driving signal according to an embodiment, discontinuous points may be converted into smooth connection points by applying the smoothing function to the guard period of the signal. Accordingly, the touch driving unit may decrease a frequency band of the touch driving signal, and may decrease noise.

Figure 22:
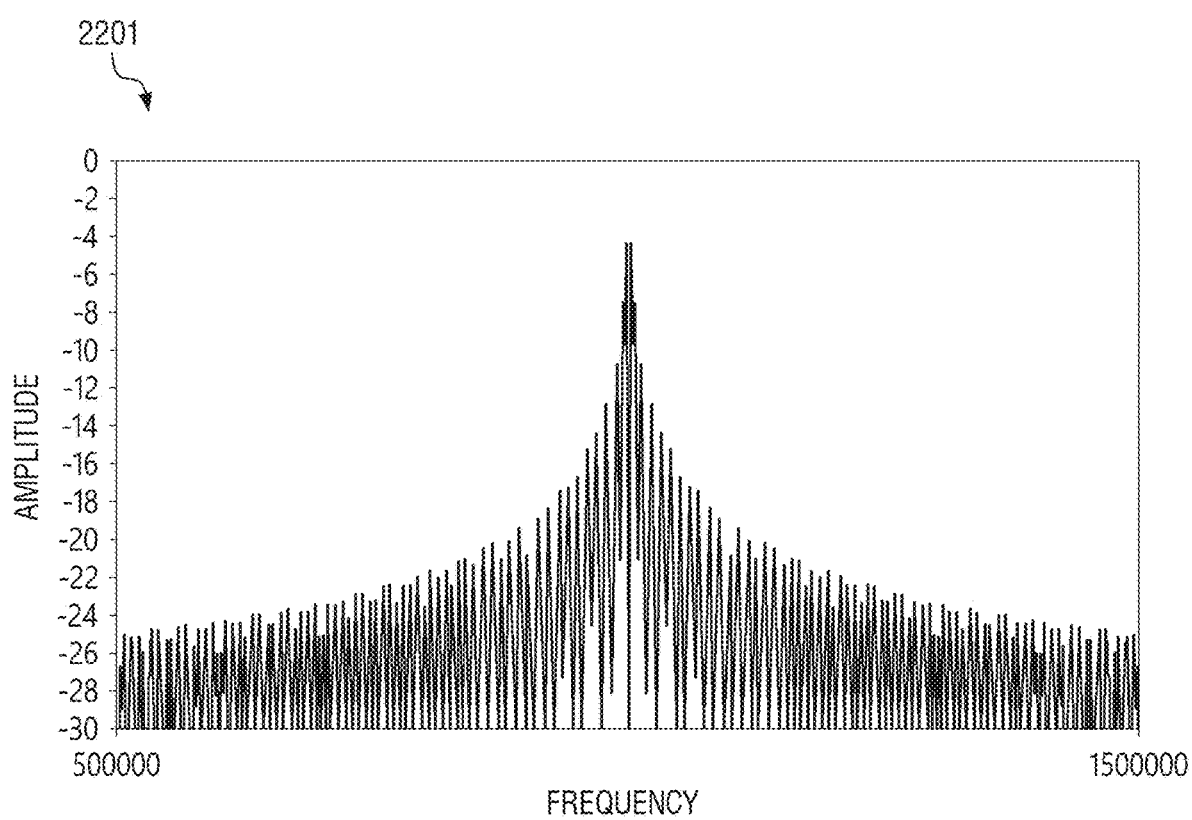
FIG. 22 is a diagram illustrating an example of a frequency band of the touch driving signal to which the smoothing function is not applied.
Figure 23:
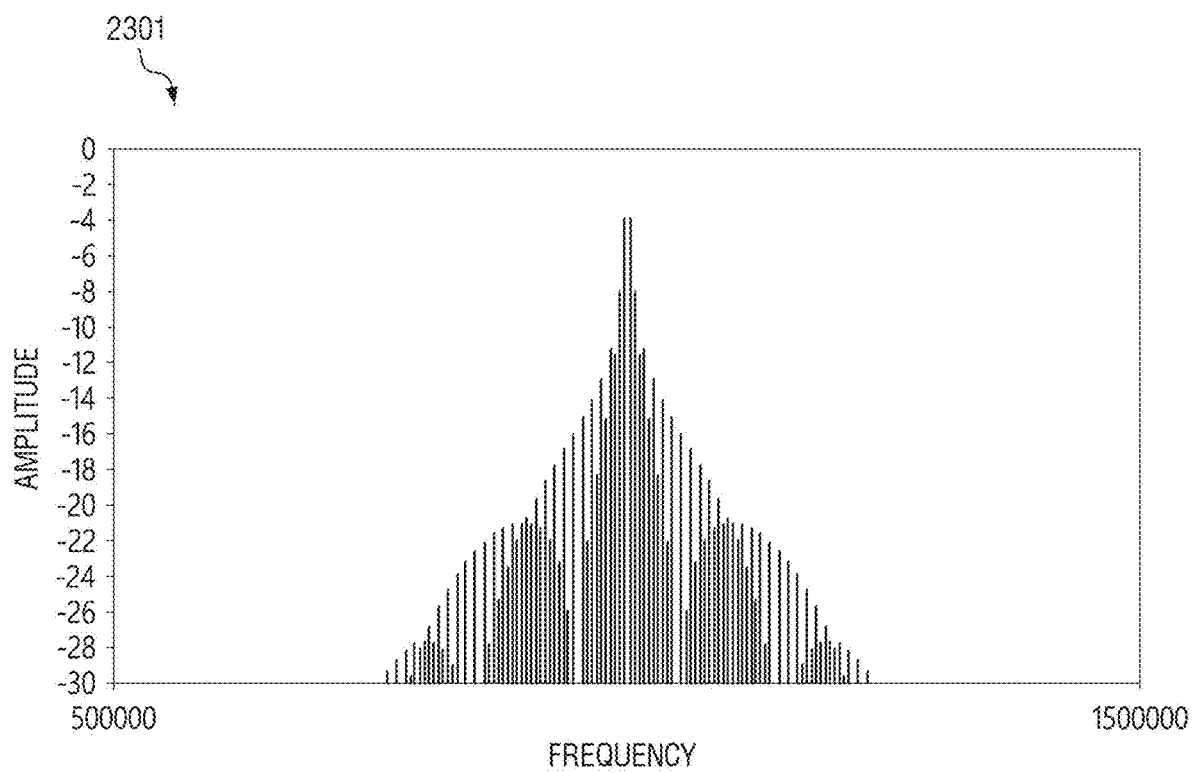
FIG. 23 is a diagram illustrating an example of a frequency band of the touch driving signal to which the smoothing function is applied according to an embodiment.

FIG. 22 is a diagram illustrating an example of a frequency band of the touch driving signal to which the smoothing function is not applied. FIG. 23 is a diagram illustrating an example of a frequency band of the touch driving signal to which the smoothing function is applied according to an embodiment.

A graph 2201 in FIG. 22 denotes a distribution graph of a frequency band of the touch driving signal to which the smoothing function is not applied.

A graph 2301 in FIG. 23 denotes a distribution graph of a frequency band of the touch driving signal to which the smoothing function is applied according to an embodiment.

Referring to the graph 2201 of FIG. 22, a frequency band of an input signal is relatively wider when the smoothing function is not applied.

Referring to the graph 2301 of FIG. 23, the frequency band of the input signal relatively decreases when the smoothing function is applied.

In FIGS. 22 and 23, a horizontal axis indicates a frequency, and a vertical axis indicates an amplitude $V_{rms}$ in a dB scale.

According to some embodiments of the present disclosure described above, the touch driving unit (e.g., the touch driving circuit 400 of FIG. 9) may preserve an original frequency value of the touch driving signal to which the orthogonal code (e.g., the complex code) is applied to decrease noise of the signal and decrease the frequency band, to prevent or substantially prevent an EMI problem for other devices included in the mobile electronic device, by applying the smoothing function.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
   a display panel comprising a display layer configured to display an image, and a touch layer on the display layer; and a touch driving circuit connected to a plurality of first electrodes and a plurality of second electrodes of the touch layer, wherein the touch driving circuit is configured to:
determine a plurality of frequencies of touch driving signals to be supplied to the plurality of first electrodes;
assign the plurality of frequencies to the touch driving signals in an ascending order;
determine a first phase of each of the touch driving signals that minimizes a cumulative value of peak-to-average ratios (PAPRs) while sequentially varying phases of the touch driving signals;
update the phases of the touch driving signals from the first phase to a second phase that minimizes the cumulative value of the PAPRs by sequentially varying the first phase of each of the touch driving signals; and
output the touch driving signals based on the plurality of frequencies assigned to the touch driving signals, respectively, and the second phase.

2. The display device of claim 1, wherein the touch driving circuit is further configured to:
update the phases of the touch driving signals from the second phase to a third phase that minimizes the cumulative value of the PAPRs by sequentially varying the second phase of each of the touch driving signals; and
output the touch driving signals based on the plurality of frequencies assigned to the touch driving signals, respectively, and the third phase.

3. The display device of claim 1, wherein the touch driving circuit is configured to repeatedly perform an operation of sequentially varying the phases of the touch driving signals a designated number of times to minimize the cumulative value of the PAPRs.

4. The display device of claim 1, wherein the touch driving circuit is configured to determine the first phase of each of the touch driving signals according to:

$$\mathrm{Tx\_sig}_i = A \cos(2\pi f_i t + \theta_i)$$

where $\mathrm{Tx\_sig}_i$ is an i-th touch driving signal, and "$\theta_i$" is a phase of the i-th touch driving signal.

5. The display device of claim 4, wherein the touch driving circuit is configured to determine the cumulative value of the PAPRs according to:

$$\mathrm{sum\_sig} = \sum_{j=0}^{i} \mathrm{Tx\_sig}_j$$

where "sum_sig" is the cumulative value of the PAPRs.

6. The display device of claim 1, wherein the touch driving circuit is configured to:
determine orthogonal codes of the touch driving signals; and
output the touch driving signals based on the determined orthogonal codes.

7. The display device of claim 6, wherein the touch driving circuit is configured to:
include the orthogonal codes in the touch driving signals;
add a guard period between periods during which symbols of the orthogonal codes are transmitted in each of the touch driving signals; and
output a smoothing signal to which a designated roll-off factor is applied in the added guard period.

8. The display device of claim 7, wherein the touch driving circuit is configured to:
generate a cyclic suffix signal attached to a rear of an original signal including the symbols of the orthogonal codes by copying a first signal corresponding to a first symbol of the original signal, and applying the roll-off factor to the copied first signal; and
generate a cyclic prefix signal attached to a front of the original signal by copying a second signal corresponding to a last symbol of the original signal, and applying the roll-off factor to the copied second signal.

9. The display device of claim 8, wherein the touch driving circuit is configured to determine a total length of each of the touch driving signals according to:

$$T_S = T_B + 2T_G$$

where "$T_S$" is the total length of each of the touch driving signals, "$T_B$" is a length of the original signal, and "$T_G$" is a length of the cyclic suffix signal or the cyclic prefix signal.

10. The display device of claim 9, wherein the touch driving circuit is configured to generate the cyclic suffix signal or the cyclic prefix signal according to:

$$H(x) = \begin{cases} 1, & |x| \le \dfrac{1-\beta}{2T} \\ \dfrac{1}{2}\left[1 + \cos\left(\dfrac{\pi T}{\beta}\left(|x| - \dfrac{1-\beta}{2T}\right)\right)\right], & \dfrac{1-\beta}{2T} < |x| \le \dfrac{1+\beta}{2T} \\ 0, & \text{otherwise} \end{cases}$$

where "T" is a total length of the signal, and "$\beta$" is the roll-off factor.

11. A mobile electronic device comprising:
a display panel comprising a display layer configured to display an image, and a touch layer on the display layer; and
a touch driving circuit connected to a plurality of first electrodes and a plurality of second electrodes of the touch layer,
wherein the touch driving circuit is configured to:
determine a plurality of frequencies of touch driving signals to be supplied to the plurality of first electrodes;
assign the plurality of frequencies to the touch driving signals in an ascending order;
determine a first phase of each of the touch driving signals that minimizes a cumulative value of PAPRs, while sequentially varying phases of the touch driving signals;
update the phases of the touch driving signals from the first phase to a second phase that minimizes the cumulative value of the PAPRs by sequentially varying the first phase of each of the touch driving signals; and output the touch driving signals based on the plurality of frequencies assigned to the touch driving signals, respectively, and the second phase.

12. The mobile electronic device of claim 11, wherein the touch driving circuit is further configured to:
update the phases of the touch driving signals from the second phase to a third phase that minimizes the cumulative value of the PAPRs by sequentially varying the second phase of each of the touch driving signals; and
output the touch driving signals based on the plurality of frequencies assigned to the touch driving signals, respectively, and the third phase.

13. The mobile electronic device of claim 11, wherein the touch driving circuit is configured to repeatedly perform an operation of sequentially varying the phases of the touch driving signals a designated number of times to minimize the cumulative value of the PAPRs.

14. The mobile electronic device of claim 11, wherein the touch driving circuit is configured to determine the first phase of each of the touch driving signals according to:

$$\text{Tx\_sig}_i = A \cos(2\pi f_i t + \theta_i)$$

where $\text{Tx\_sig}_i$ is an i-th touch driving signal, and "$\theta_i$" is a phase of the i-th touch driving signal.

15. The mobile electronic device of claim 14, wherein the touch driving circuit is configured to determine the cumulative value of the PAPRs according to:

$$\text{sum\_sig} = \sum_{j=0}^{i} \text{Tx\_sig}_j$$

where "sum_sig" is the cumulative value of the PAPRs.

16. The mobile electronic device of claim 11, wherein the touch driving circuit is configured to:
determine orthogonal codes of the touch driving signals; and
output the touch driving signals based on the determined orthogonal codes.

17. The mobile electronic device of claim 16, wherein the touch driving circuit is configured to:
include the orthogonal codes in the touch driving signals;
add a guard period between periods during which symbols of the orthogonal codes are transmitted in each of the touch driving signals; and
output a smoothing signal to which a designated roll-off factor is applied in the added guard period.

18. The mobile electronic device of claim 17, wherein the touch driving circuit is configured to:
generate a cyclic suffix signal attached to a rear of an original signal including the symbols of the orthogonal codes by copying a first signal corresponding to a first symbol of the original signal, and applying the roll-off factor to the copied first signal; and
generate a cyclic prefix signal attached to a front of the original signal by copying a second signal corresponding to a last symbol of the original signal, and applying the roll-off factor to the copied second signal.

19. The mobile electronic device of claim 18, wherein the touch driving circuit is configured to determine a total length of each of the touch driving signals according to:

$$T_S = T_B + 2T_G$$

where "$T_S$" is the total length of each of the touch driving signals, "$T_B$" is a length of the original signal, and "$T_G$" is a length of the cyclic suffix signal or the cyclic prefix signal.

20. The mobile electronic device of claim 19, wherein the touch driving circuit is configured to generate the cyclic suffix signal or the cyclic prefix signal according to:

$$H(x) = \begin{cases} 1, & |x| \leq \frac{1-\beta}{2T} \\ \frac{1}{2}\left[1 + \cos\left(\frac{\pi T}{\beta}\left(|x| - \frac{1-\beta}{2T}\right)\right)\right], & \frac{1-\beta}{2T} < |x| \leq \frac{1+\beta}{2T} \\ 0, & \text{otherwise} \end{cases}$$

where "T" is a total length of the signal, and "$\beta$" is the roll-off factor.

* * * * *